(12) United States Patent
Gu et al.

(10) Patent No.: US 8,156,071 B2
(45) Date of Patent: *Apr. 10, 2012

(54) BYTE-LEVEL FILE DIFFERENCING AND UPDATING ALGORITHMS

(75) Inventors: Jinsheng Gu, San Mateo, CA (US); Luosheng Peng, Santa Clara, CA (US)

(73) Assignee: Innopath Software, Inc., Sunnyvale, CA (US)

( * ) Notice: Subject to any disclaimer, the term of this patent is extended or adjusted under 35 U.S.C. 154(b) by 1302 days.

This patent is subject to a terminal disclaimer.

(21) Appl. No.: 11/154,492

(22) Filed: Jun. 15, 2005

(65) Prior Publication Data

US 2005/0234997 A1    Oct. 20, 2005

Related U.S. Application Data

(63) Continuation of application No. 10/146,545, filed on May 13, 2002, now Pat. No. 6,925,467.

(51) Int. Cl.
*G06F 15/16* (2006.01)

(52) U.S. Cl. ............ 707/101; 341/50; 341/51; 717/168; 717/169; 717/170; 717/171; 717/172; 717/173; 707/610

(58) Field of Classification Search ............... 707/1, 101, 707/203, 204, 610; 717/168; 341/50–51
See application file for complete search history.

(56) References Cited

U.S. PATENT DOCUMENTS

| | | | |
|---|---|---|---|
| 4,875,159 A | 10/1989 | Cary | |
| 5,444,764 A | 8/1995 | Galecki | |
| 5,479,654 A | 12/1995 | Squibb | |
| 5,485,575 A * | 1/1996 | Chess et al. | 714/38 |
| 5,574,906 A | 11/1996 | Morris | |
| 5,634,052 A | 5/1997 | Morris | |
| 5,729,735 A | 3/1998 | Meyering | |
| 5,742,905 A | 4/1998 | Pepe | |
| 5,758,062 A | 5/1998 | McMahon | |
| 5,806,078 A | 9/1998 | Hug | |
| 5,813,017 A | 9/1998 | Morris | |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

*Primary Examiner* — Duyen Doan
(74) *Attorney, Agent, or Firm* — Gregory & Sawrie LLP

(57) ABSTRACT

A method for performing differencing and updating between electronic files is provided. A byte-level file differencing algorithm receives two byte streams corresponding to an original file and a new file. The new file includes updated and revised versions of the original file. The file differencing algorithm determines a longest common sub-string (LCS) between the two byte streams and divides each of the two byte streams into sub-streams. The sub-streams include the LCS along with prefix and suffix sub-streams to the LCS. The file differencing algorithm then recursively determines an LCS and divides each sub-stream until a size of the sub-streams is less than a pre-specified size. Byte-level differences are then identified between each of the corresponding sub-streams. Further, the file differencing algorithm defines a protocol for structuring a delta file by using a set of operation codes and a variable length integer format to eliminate redundant information in the delta file. Using this protocol, the file differencing algorithm generates the delta file including an operation array that codes the identified byte-level differences.

34 Claims, 20 Drawing Sheets

U.S. PATENT DOCUMENTS

| | | | |
|---|---|---|---|
| 5,832,520 | A | 11/1998 | Miller |
| 5,850,565 | A | 12/1998 | Wightman |
| 5,864,757 | A | 1/1999 | Parker |
| 5,893,119 | A | 4/1999 | Squibb |
| 5,977,889 | A * | 11/1999 | Cohen ............................ 341/55 |
| 6,018,747 | A | 1/2000 | Burns |
| 6,041,333 | A | 3/2000 | Bretschneider |
| 6,052,531 | A | 4/2000 | Waldin |
| 6,076,148 | A | 6/2000 | Kedem |
| 6,078,967 | A | 6/2000 | Fulghum |
| 6,088,694 | A | 7/2000 | Burns |
| 6,128,629 | A | 10/2000 | Bretschneider |
| 6,145,012 | A | 11/2000 | Small |
| 6,163,811 | A | 12/2000 | Porter |
| 6,167,258 | A | 12/2000 | Schmidt |
| 6,216,175 | B1 | 4/2001 | Sliger |
| 6,226,784 | B1 | 5/2001 | Holmes |
| 6,233,589 | B1 * | 5/2001 | Balcha et al. ................. 707/625 |
| 6,269,456 | B1 | 7/2001 | Hodges |
| 6,327,671 | B1 | 12/2001 | Menon |
| 6,349,311 | B1 | 2/2002 | Sobel |
| 6,374,250 | B2 | 4/2002 | Ajtai |
| 6,401,239 | B1 | 6/2002 | Miron |
| 6,411,227 | B1 | 6/2002 | Fish |
| 6,425,125 | B1 * | 7/2002 | Fries et al. .................... 717/168 |
| 6,442,660 | B1 | 8/2002 | Henerlau |
| 6,457,175 | B1 | 9/2002 | Lerche |
| 6,466,999 | B1 | 10/2002 | Sliger |
| 6,470,329 | B1 | 10/2002 | Livschitz |
| 6,526,574 | B1 * | 2/2003 | Jones ............................ 717/168 |
| 6,535,894 | B1 | 3/2003 | Schmidt |
| 6,542,906 | B2 | 4/2003 | Korn |
| 6,594,822 | B1 | 7/2003 | Schweitz |
| 6,615,404 | B1 | 9/2003 | Garfunkel |
| 6,629,110 | B2 | 9/2003 | Cane |
| 6,651,061 | B2 | 11/2003 | Unchida et al. |
| 6,651,190 | B1 | 11/2003 | Worley |
| 6,662,163 | B1 | 12/2003 | Albayrak |
| 6,671,703 | B2 | 12/2003 | Thompson |
| 6,671,757 | B1 | 12/2003 | Multer et al. |
| 6,694,336 | B1 | 2/2004 | Multer |
| 6,701,315 | B1 | 3/2004 | Austin |
| 6,754,816 | B1 | 6/2004 | Layton |
| 6,785,786 | B1 | 8/2004 | Gold |
| 6,836,657 | B2 | 12/2004 | Ji |
| 6,892,381 | B2 | 5/2005 | Kim |
| 6,898,564 | B1 | 5/2005 | Odhner |
| 6,912,591 | B2 | 6/2005 | Lash |
| 6,925,467 | B2 * | 8/2005 | Gu et al. ...................... 707/101 |
| 6,954,765 | B2 | 10/2005 | Spiegel |
| 7,076,486 | B2 * | 7/2006 | Livshits ............................ 1/1 |
| 2001/0029178 | A1 | 10/2001 | Criss |
| 2001/0049263 | A1 | 12/2001 | Zhang |
| 2002/0089436 | A1 * | 7/2002 | Yariv ............................ 341/51 |
| 2002/0099726 | A1 | 7/2002 | Crudele |
| 2002/0120697 | A1 | 8/2002 | Generous |
| 2002/0129107 | A1 | 9/2002 | Loughran |
| 2002/0146073 | A1 * | 10/2002 | Clark et al. .............. 375/240.26 |
| 2003/0110253 | A1 | 6/2003 | Anuszczyk |
| 2003/0200207 | A1 | 10/2003 | Dickinson |
| 2003/0212712 | A1 | 11/2003 | Gu |
| 2003/0220944 | A1 | 11/2003 | Schottland |
| 2004/0031027 | A1 | 2/2004 | Hiltgen |
| 2004/0062130 | A1 | 4/2004 | Chiang |
| 2004/0073582 | A1 | 4/2004 | Spiegel |
| 2004/0092255 | A1 | 5/2004 | Ji |
| 2004/0098361 | A1 | 5/2004 | Peng |
| 2004/0098413 | A1 | 5/2004 | Peng |
| 2004/0098420 | A1 | 5/2004 | Peng |
| 2004/0098421 | A1 | 5/2004 | Peng |
| 2004/0098427 | A1 | 5/2004 | Peng |
| 2004/0111427 | A1 | 6/2004 | Gu |
| 2004/0111484 | A1 | 6/2004 | Young |
| 2004/0193643 | A1 | 9/2004 | O'Brien |
| 2004/0220980 | A1 | 11/2004 | Forster |
| 2004/0225996 | A1 | 11/2004 | Venkatesan |
| 2004/0260923 | A1 | 12/2004 | Nakai |
| 2005/0010576 | A1 | 1/2005 | Ren |
| 2005/0010870 | A1 | 1/2005 | Gu |
| 2005/0060163 | A1 | 3/2005 | Barsness |
| 2005/0091288 | A1 | 4/2005 | Ji |
| 2005/0102318 | A1 | 5/2005 | Odhner |
| 2005/0234997 | A1 | 10/2005 | Gu |

OTHER PUBLICATIONS

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

Hauptmann, Steffen et al., "On-line maintenance with on-the-fly software replacement", Configurable Distributed Systems, Proceedings, Third IEEE International Conference, May 6, 1996, pp. 80-80.

Chakravorty et al., "Architecture and implementation of a remote management framework for dynamically reconfigurable devices", Networks, 2002. ICON 2002. 10th IEEE International Conference, Aug. 27, 2002, pp. 375-380.

Lyu et al., "A procedure0based dynamic software update", Dependable Systems and Networks, 2001. Proceedings, The International Conference, Jul. 1, 2001. pp. 271-280.

Bialek, R. P., "The architecture of a dynamically updatable, component-based system", Computer Software and Application Conference, 2002. COMPSAC 2002. Proceedings, 26th Annual International, Aug. 26, 2002, pp. 1012-1016.

Gumbold, M., "Software distribution by reliable multicast", Local Computer Networks, 1996. Proceedings, 21st IEEE Conference, Oct. 13, 1996, pp. 222-231.

* cited by examiner

| | | |
|---|---|---|
| 1302 | opcode | one character to describe the meaning of an operation, such as insertion, deletion |
| 1304 | relative_start_addr | the offset between current modification and previous modification in new byte stream |
| 1306a | operating_len | the length of the new content which replaces some old content |
| 1306b | operated_len | the length of the old content which is replaced by some new content |
| 1306c | repeat_times | the number of occurrences of a pattern |
| 1306d | interval_len | the length of an interval where a pattern repeats one time |
| 1306e | data_offset | the offset of the delta file where a copy of current operation can be found |
| 1308 | real_data | the replacing content, or the 1 byte shift value if the opcode is ADDRESS_REPEAT_SHIFT |

FIG. 14

| opcode | relative_start_addr | operating_len | operated_len | repeat_times | interval_len | real_data |
|---|---|---|---|---|---|---|
| INSERTION | ✓ |  |  |  |  | ✓ |
| DELETION | ✓ | ✓ |  |  |  |  |
| REPLACEMENT | ✓ | ✓ | ✓ |  |  | ✓ |
| VARIABLE_LEN_REPLACEMENT | ✓ | ✓ | ✓ |  |  | ✓ |
| ADDRESS_REPEAT_SHIFT | ✓ |  |  | ✓ | ✓ |  |
| SAME_ADDRESS_REPEAT_SHIFT | ✓ |  |  | ✓ | ✓ |  |
| ONE_BYTE_DELETION | ✓ |  |  |  |  |  |
| TWO_BYTE_DELETION | ✓ |  |  |  |  |  |
| THR_BYTE_DELETION | ✓ |  |  |  |  |  |
| FOU_BYTE_DELETION | ✓ |  |  |  |  |  |
| FIV_BYTE_DELETION | ✓ |  |  |  |  |  |
| SIX_BYTE_DELETION | ✓ |  |  |  |  |  |
| SEV_BYTE_DELETION | ✓ |  |  |  |  |  |
| EIG_BYTE_DELETION | ✓ |  |  |  |  |  |
| NIN_BYTE_DELETION | ✓ |  |  |  |  |  |
| TEN_BYTE_DELETION | ✓ |  |  |  |  |  |
| ONE_BYTE_INSERTION | ✓ |  |  |  |  | ✓ |
| TWO_BYTE_INSERTION | ✓ |  |  |  |  | ✓ |
| THR_BYTE_INSERTION | ✓ |  |  |  |  | ✓ |
| FOU_BYTE_INSERTION | ✓ |  |  |  |  | ✓ |
| FIV_BYTE_INSERTION | ✓ |  |  |  |  | ✓ |
| SIX_BYTE_INSERTION | ✓ |  |  |  |  | ✓ |
| SEV_BYTE_INSERTION | ✓ |  |  |  |  | ✓ |
| EIG_BYTE_INSERTION | ✓ |  |  |  |  | ✓ |
| NIN_BYTE_INSERTION | ✓ |  |  |  |  | ✓ |
| TEN_BYTE_INSERTION | ✓ |  |  |  |  | ✓ |

FIG. 15A

| | | | | | | |
|---|---|---|---|---|---|---|
| ONE_BYTE_REPLACEMENT | ✓ | | | | | ✓ |
| TWO_BYTE_REPLACEMENT | ✓ | | | | | ✓ |
| THR_BYTE_REPLACEMENT | ✓ | | | | | ✓ |
| FOU_BYTE_REPLACEMENT | ✓ | | | | | ✓ |
| FIV_BYTE_REPLACEMENT | ✓ | | | | | ✓ |
| SIX_BYTE_REPLACEMENT | ✓ | | | | | ✓ |
| SEV_BYTE_REPLACEMENT | ✓ | | | | | ✓ |
| EIG_BYTE_REPLACEMENT | ✓ | | | | | ✓ |
| NIN_BYTE_REPLACEMENT | ✓ | | | | | ✓ |
| TEN_BYTE_REPLACEMENT | ✓ | | | | | ✓ |
| T11_BYTE_REPLACEMENT | ✓ | | | | | ✓ |
| T12_BYTE_REPLACEMENT | ✓ | | | | | ✓ |
| T13_BYTE_REPLACEMENT | ✓ | | | | | ✓ |
| T14_BYTE_REPLACEMENT | ✓ | | | | | ✓ |
| T15_BYTE_REPLACEMENT | ✓ | | | | | ✓ |
| T16_BYTE_REPLACEMENT | ✓ | | | | | ✓ |
| T17_BYTE_REPLACEMENT | ✓ | | | | | ✓ |
| T18_BYTE_REPLACEMENT | ✓ | | | | | ✓ |
| T19_BYTE_REPLACEMENT | ✓ | | | | | ✓ |
| T20_BYTE_REPLACEMENT | ✓ | | | | | ✓ |
| ONE_BYTE_FIX_LEN_REPEAT_REPLACE | ✓ | | | | ✓ | ✓ |
| TWO_BYTE_FIX_LEN_REPEAT_REPLACE | ✓ | | | | ✓ | ✓ |
| THR_BYTE_FIX_LEN_REPEAT_REPLACE | ✓ | | | | ✓ | ✓ |
| FOU_BYTE_FIX_LEN_REPEAT_REPLACE | ✓ | | | | ✓ | ✓ |
| FIV_BYTE_FIX_LEN_REPEAT_REPLACE | ✓ | | | | ✓ | ✓ |
| SIX_BYTE_FIX_LEN_REPEAT_REPLACE | ✓ | | | | ✓ | ✓ |
| SEV_BYTE_FIX_LEN_REPEAT_REPLACE | ✓ | | | | ✓ | ✓ |

| | | | | | |
|---|---|---|---|---|---|
| EIG_BYTE_FIX_LEN_REPEAT_REPLACE | | | | | ✓ |
| NIN_BYTE_FIX_LEN_REPEAT_REPLACE | ✓ | | | | ✓ |
| TEN_BYTE_FIX_LEN_REPEAT_REPLACE | ✓ | | | | ✓ |
| T11_BYTE_FIX_LEN_REPEAT_REPLACE | ✓ | | | | ✓ |
| T12_BYTE_FIX_LEN_REPEAT_REPLACE | ✓ | | | ✓ | ✓ |
| T13_BYTE_FIX_LEN_REPEAT_REPLACE | ✓ | | | ✓ | ✓ |
| T14_BYTE_FIX_LEN_REPEAT_REPLACE | ✓ | | | ✓ | ✓ |
| T15_BYTE_FIX_LEN_REPEAT_REPLACE | ✓ | | | ✓ | ✓ |
| T16_BYTE_FIX_LEN_REPEAT_REPLACE | ✓ | | ✓ | ✓ | ✓ |
| T17_BYTE_FIX_LEN_REPEAT_REPLACE | ✓ | | ✓ | ✓ | ✓ |
| T18_BYTE_FIX_LEN_REPEAT_REPLACE | ✓ | | ✓ | ✓ | ✓ |
| T19_BYTE_FIX_LEN_REPEAT_REPLACE | ✓ | | ✓ | ✓ | ✓ |
| T20_BYTE_FIX_LEN_REPEAT_REPLACE | ✓ | | ✓ | ✓ | ✓ |
| T21_BYTE_FIX_LEN_REPEAT_REPLACE | ✓ | | ✓ | ✓ | ✓ |
| T22_BYTE_FIX_LEN_REPEAT_REPLACE | ✓ | | ✓ | ✓ | ✓ |
| T23_BYTE_FIX_LEN_REPEAT_REPLACE | ✓ | | ✓ | ✓ | ✓ |
| T24_BYTE_FIX_LEN_REPEAT_REPLACE | ✓ | | ✓ | ✓ | ✓ |
| T25_BYTE_FIX_LEN_REPEAT_REPLACE | ✓ | | ✓ | ✓ | ✓ |
| T26_BYTE_FIX_LEN_REPEAT_REPLACE | ✓ | | ✓ | ✓ | ✓ |
| T27_BYTE_FIX_LEN_REPEAT_REPLACE | ✓ | | ✓ | ✓ | ✓ |
| T28_BYTE_FIX_LEN_REPEAT_REPLACE | ✓ | | ✓ | ✓ | ✓ |
| T29_BYTE_FIX_LEN_REPEAT_REPLACE | ✓ | | ✓ | ✓ | ✓ |
| T30_BYTE_FIX_LEN_REPEAT_REPLACE | ✓ | | ✓ | ✓ | ✓ |
| ONE_BYTE_FIX_LEN_REPEAT_REPLACE_END_NO_M | ✓ | | ✓ | ✓ | ✓ |
| TWO_BYTE_FIX_LEN_REPEAT_REPLACE_END_NO_M | ✓ | | ✓ | ✓ | ✓ |
| THR_BYTE_FIX_LEN_REPEAT_REPLACE_END_NO_M | ✓ | | ✓ | ✓ | ✓ |
| FOU_BYTE_FIX_LEN_REPEAT_REPLACE_END_NO_M | ✓ | | ✓ | ✓ | ✓ |

FIG. 15D

| opcode | relative_start_addr | delta_offset | real_data |
|---|---|---|---|
| EXACT_COPY_INDEX_TO | Y | Y | |
| WHOLE_REPLACEMENT | | | Y |

FIG. 15E

BYTE-LEVEL FILE DIFFERENCING AND UPDATING ALGORITHMS

RELATED APPLICATION

This application is a continuation application of U.S. patent application Ser. No. 10/146,545, filed May 13, 2002 now U.S. Pat. No. 6,925,467.

TECHNICAL FIELD

The disclosed embodiments relate to file updating such as software management using difference files.

BACKGROUND

Software running on a processor or central processing unit (CPU) to provide certain functionality often changes over time. The changes may result from the need to correct bugs, or errors, in the software files, adapt to evolving technologies, or add new features. In particular, embedded software components hosted on mobile wireless devices often include numerous software bugs that require correction.

Software includes one or more files in the form of human-readable American Standard Code for Information Interchange (ASCII) plain text files or binary code. Software files can be divided into smaller units that are often referred to as modules or components. A UNIX platform or personal computer (PC) includes multiple software components, and each of the software components is managed and updated independently through a file system supported by a corresponding operating system (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in mobile wireless devices, a real-time operating system (RTOS) is typically used in which all software components are linked as a single large file. Further, no file system support is typically provided in these mobile wireless devices. In addition, the single large file needs to be pre-loaded, or embedded, into the device using a slow communication link like a radio, infrared, or serial link.

Obstacles to updating the large files of mobile wireless devices via slow communication links include the time, bandwidth, and cost associated with delivering the updated file to the device. Distribution of such large files can take an undesirably long time from the point of view of the customer and can consume a large amount of server resources from the point of view of the file provider. Delivering a large file over an unreliable communication link such as a radio link may also increase the rate of communication failure and require a large working memory within the device, for example random access memory (RAM).

One existing solution to the problem of delivering large files to mobile devices includes the use of compression. A number of existing compression algorithms are commonly used. These algorithms typically support compression of a file down to approximately 40% of its original size; often, however, even the compressed file is too large for download to a device via a slow, costly, narrowband communication link.

Another typical solution for updating files uses difference programs to generate a description of how a revised file differs from an original file. There are commonly available difference programs running on UNIX or PC platforms that produce such difference data. The size of the difference data file corresponding to a large binary file can be as small as 10% to 20% of the revised or original file size. However, as with compression, the difference file produced using these difference programs is often too large for transfer via the associated communication protocols. In addition, the difference programs known in the art are not efficient in that they require long computation times for generating the difference file and a large amount of working memory in the mobile communication device to effect the update of the original file.

BRIEF DESCRIPTION OF THE FIGURES

FIG. 14 is a table including operation descriptions, under the embodiment of FIG. 13.

Figure 15D:
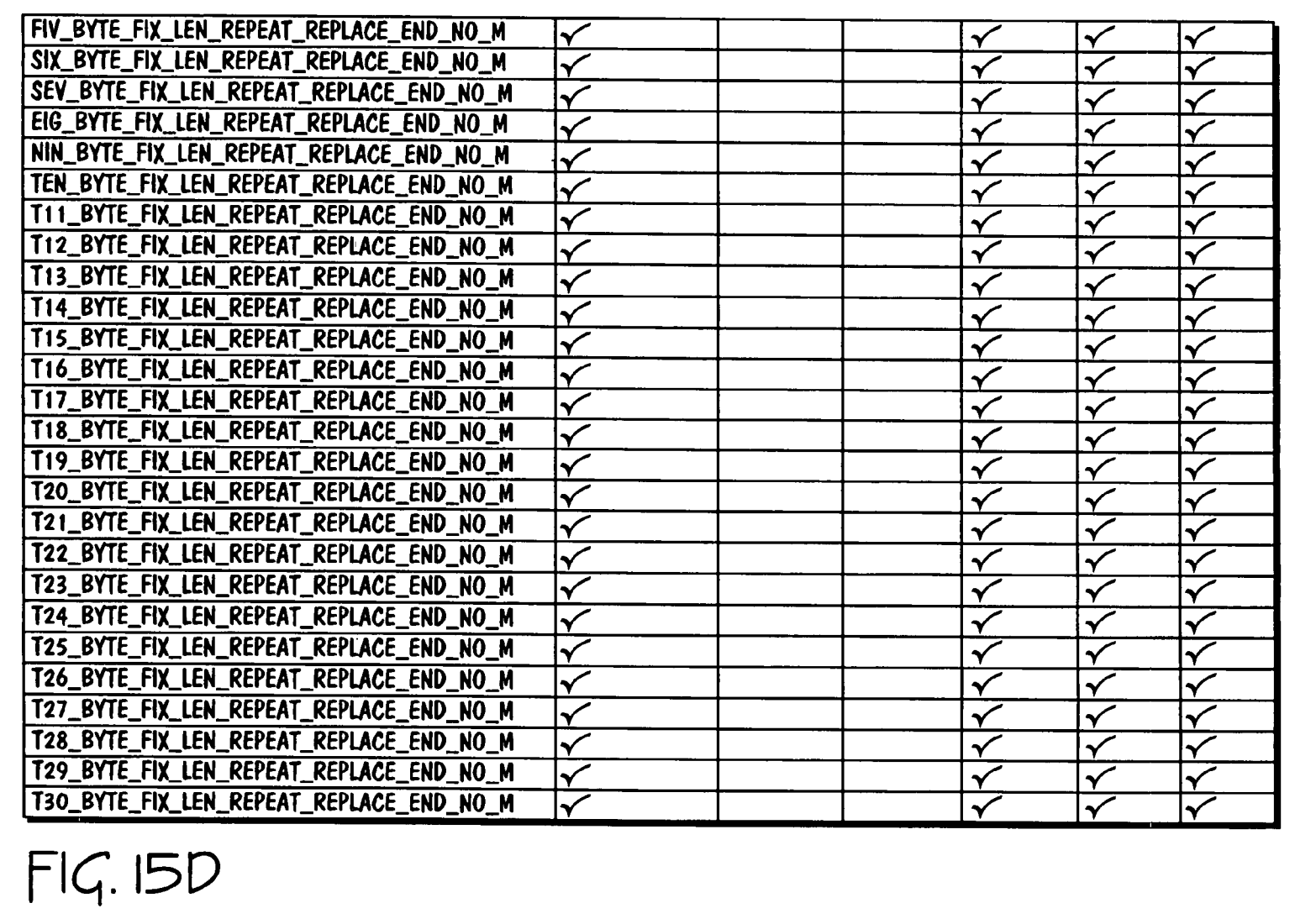

FIGS. 15A, 15B, 15C, 15D and 15E show a summary table of operation codes along with associated fields, introduced under an embodiment.

Figure 1:
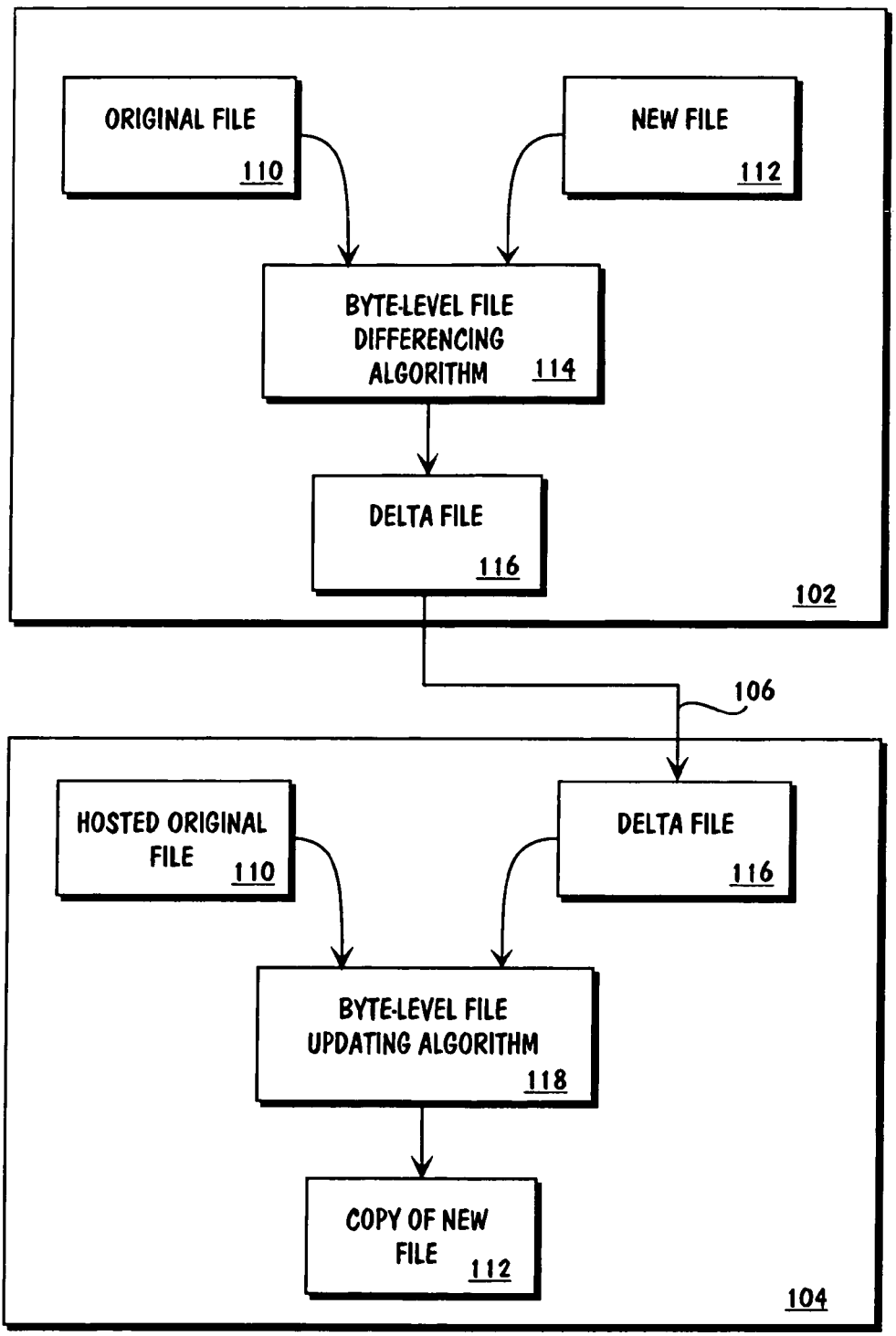
FIG. 1 is a block diagram showing file differencing and updating provided by byte-level file differencing and updating (FDU) algorithms, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 106 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

DETAILED DESCRIPTION

A byte-level file differencing and updating (FDU) algorithm, herein referred to as the FDU algorithm, is described in detail herein. FIG. 1 is a block diagram showing file differencing and updating provided by the FDU algorithm of an embodiment. The FDU algorithm includes a differencing component and an updating component. The differencing component, referred to herein as the file differencing algorithm, generates a difference file in a first computer system from an original version and a new version of an electronic file. The updating component, referred to herein as the file updating algorithm, generates a copy of the new file on a second computer system using the difference file and the hosted copy of the original file. In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 104 communicate via a communication path 106. These computer systems 102 and 104 include any collection of computing devices operating together, as is known in the art. The computer systems 102 and 104 also include components within a larger computer system. The communication path 106 includes any medium by which files are communicated or transferred between the computer systems 102 and 104. Therefore, this path 106 includes wireless connections, wired connections, and hybrid wireless/wired connections. The communication path 106 also includes couplings or connections to networks including local area networks (LANs), metropolitan area networks (MANs), wide area networks (WANs), proprietary networks, interoffice or backend networks, and the Internet. Furthermore, the communication path 106 includes removable fixed mediums like floppy disks, hard disk drives, and CD-ROM disks, as well as telephone lines, buses, and electronic mail messages.

The first communication system 102 receives an original, or old, version 110 and a new version 112 of an electronic file. The new file 112 is generally an updated or revised version of the original file 110, but is not so limited. The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream, depending the context.

The file differencing algorithm 114 receives the new file 112, compares it to the original file 110, and calculates the byte-level differences between the compared files, as described below. The file differencing algorithm 114 may also pre-process the original 110 and the new 112 files to reduce the sizes of the files prior to the calculation of the file differences. The file differencing algorithm 114 generates a difference file 116, referred to herein as a delta file, during the comparison.

Contents of the delta file 116 provide an efficient representation of the byte-level differences between the new and the original files. The delta file 116 includes meta-data along with actual data of replacement and/or insertion operations that represents the differences between the new or current version of the associated file and previous versions of the file, as described below. The file differencing algorithm 114 provides any differences between the original 110 and the new 112 files in the delta file 116 using a minimum number of bytes and a pre-defined format or protocol described below, thereby providing a delta file optimized in space.

The delta file 116 is transferred or transmitted to another computer system via the communication path 106. Prior to transfer, the delta file 116 may be compressed using compression techniques known in the art, but is not so limited. The file updating algorithm 118 hosted on the receiving computer system uses the delta file 116 along with the hosted original file 110 to generate or create a copy of the new file 112. This copy of the new file 112 is then used to update the original file 110 hosted on the client device that is targeted for revision or updating. Upon completion of this update process, the new file now stored on the second computer system is identical to the new file received in the first computer system.

The differences between an original file and a new file are typically smaller than the new file itself, leading to significant storage and transmission savings if the differences are transmitted and stored instead of the entire new byte stream. This is particularly important for mobile electronic devices hosting programs that are updated via connections that typically can be slow and expensive, for example wireless or cellular connections. The delta file described herein provides the differences between the new and the original files in a format that is up to 99% smaller than the new file, and this reduced file size provides numerous improvements over typical differencing techniques. One improvement is a reduction in bandwidth required for transmission of the delta file to the client device; the smaller file means less bandwidth is required for the transfer. Also, smaller files require less time for transmission and, therefore, decrease the probability that the file transfer will be interrupted and simultaneously reduce transmission errors in the received file. As for file security, transfer of the delta file instead of the entire new file eliminates piracy of the new file. All of these improvements increase customer satisfaction.

Figure 2:
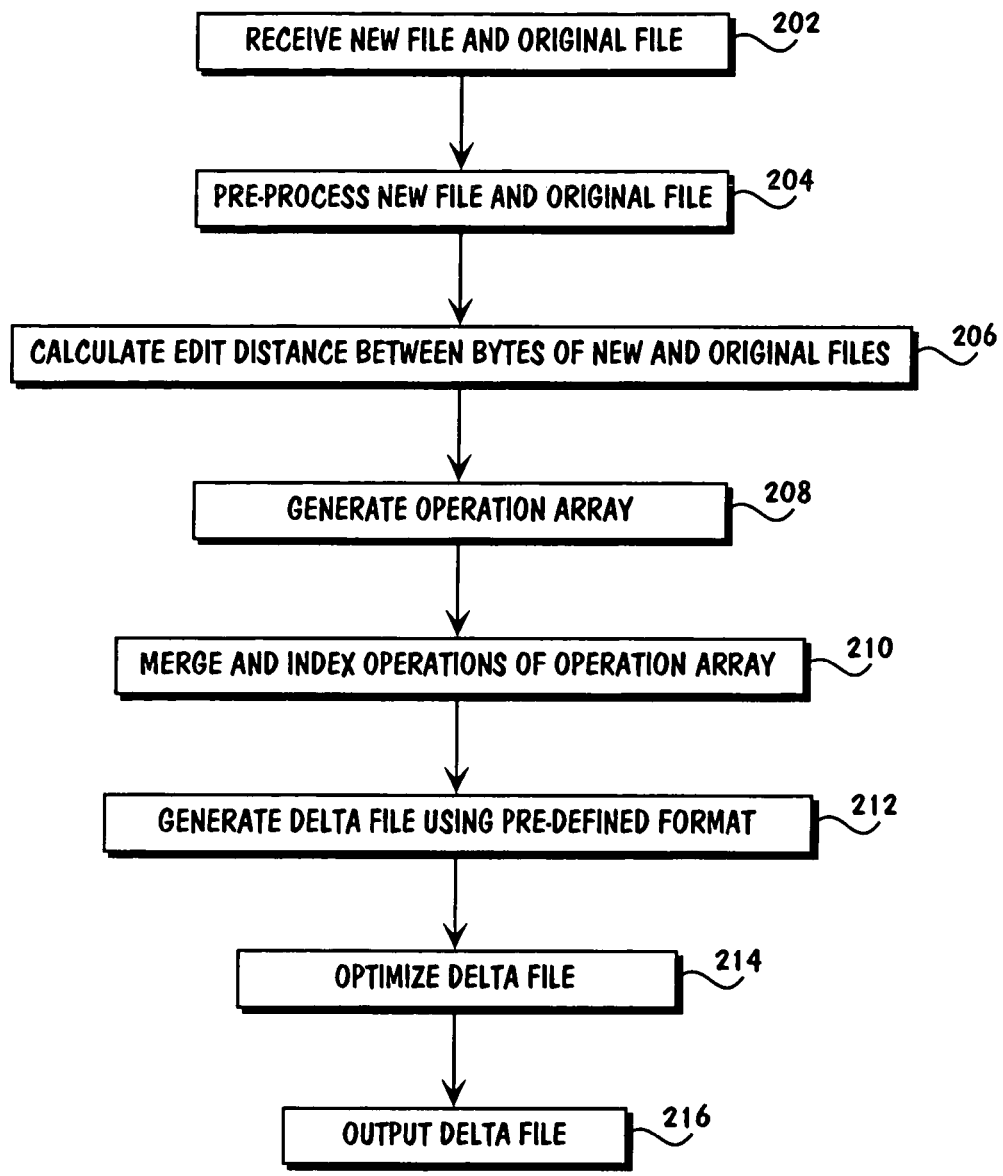
FIG. 2 is a flow diagram for generating a delta file, under the embodiment of FIG. 1.

FIG. 2 is a flow diagram for generation of a delta file, under an embodiment. Operation begins when a new file and an original file are received in a first processing system 202. Pre-processing operations are performed between the new file and the original file in order to identify common segments and simple patterns among contents of the two files 204. The pre-processing algorithm uses identified common segments and patterns to reduce the sizes of the new and original files. Thus, this pre-processing eliminates the need to perform difference calculations on common segments of the files, thereby increasing the efficiency of the difference calculation.

Following pre-processing, the byte-level differences are calculated between the new file and the original file 206. The calculated differences are coded using an operation array 208. Merging operations are applied to the operation array in order to reduce the overhead in delta file creation 210. The delta file is generated by writing the operation array into a file using a variable length integer format that minimizes the number of bytes required to define the differences between the files 212. This variable length integer format is described further below.

The delta file is then optimized to further reduce the file size, when possible 214. The optimization includes compression and adding checksum bits or bytes so that errors can be detected following transmission of the delta file to the client device. The optimized delta file is then provided as an output 216. The delta file of an embodiment is stored for future transfer or transmission to other computer systems hosting copies of the original file.

As described above, pre-processing operations are performed between the contents of the new file and the original file in order to identify common segments and simple patterns among contents of the two files. The knowledge of common segments and simple patterns is used to reduce the number of bytes on which the comparison is run, thereby resulting in an overall performance gain. Often, the new file is only slightly different from the original file like, for example, when the new file is used to fix a software bug, add a new feature, or enhance an existing feature. Therefore, an overall performance gain is realized because the cumulative time required to perform less complex pre-processing operations along with differencing operations on a subset of the files is much less than the time required to perform differencing operations on the entire contents of the new and original files. This is especially true in cases involving only a single insertion or deletion. Therefore, pre-processing reduces the overall difference calculation time resulting in a performance gain. Each of the processes of delta file generation is detailed below.

Figure 3:
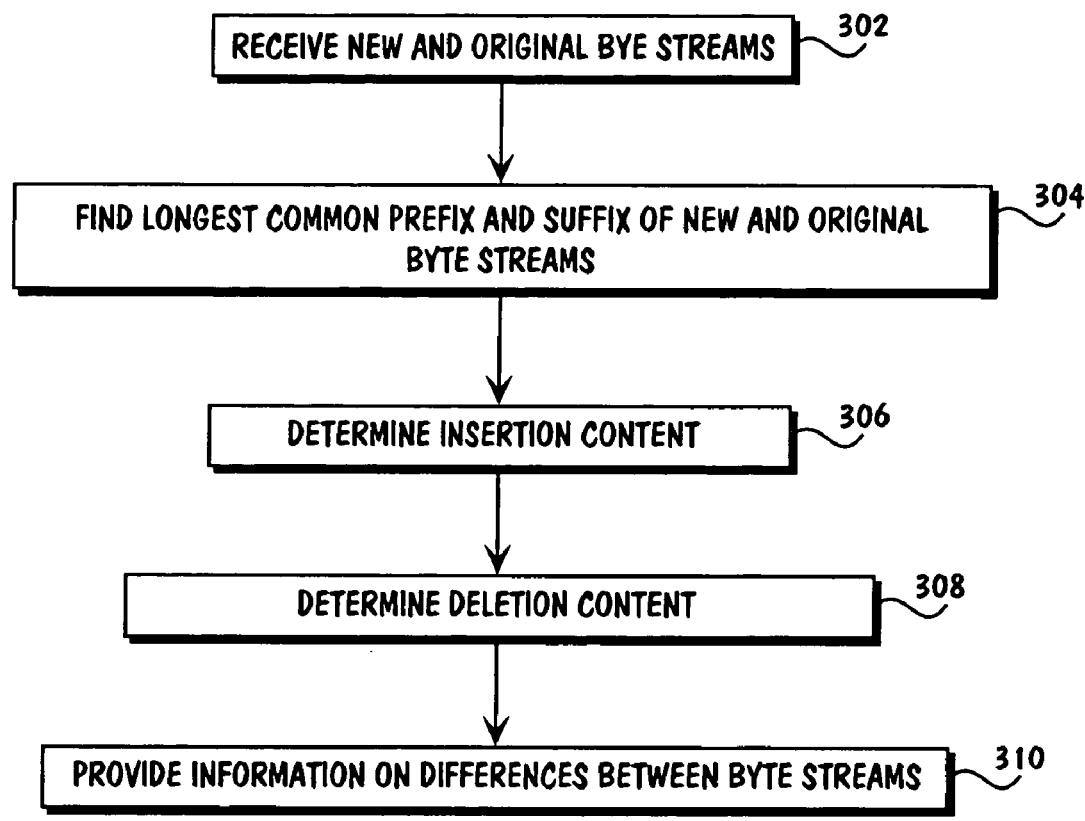
FIG. 3 is a flow diagram of a method of pre-processing files prior to performing a comparison between files, under an embodiment of the FDU algorithm.

FIG. 3 is a flow diagram of a method of pre-processing files prior to performing a comparison between files, under an embodiment. The pre-processing includes operations to determine insertion content, determine deletion content, determine concatenations or special cases of insertion and deletion content, and write information to a file regarding these determinations.

Figure 4:
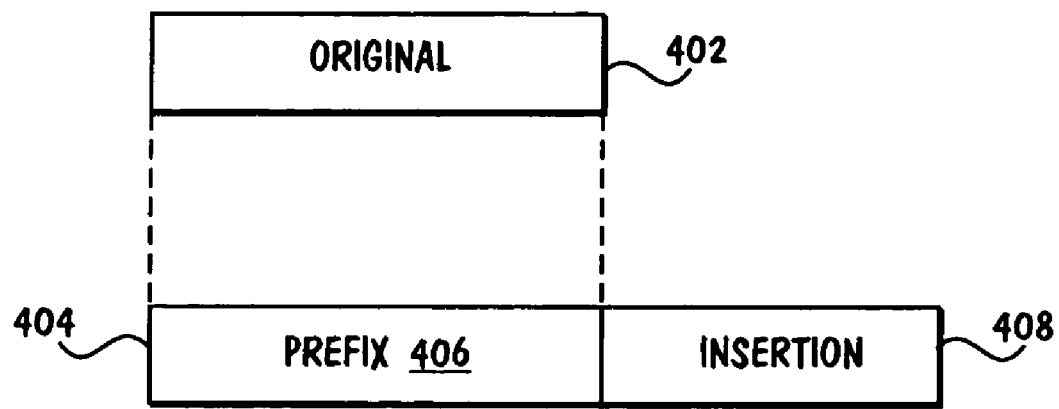
FIG. 4 shows identified insertion data of a new file suffix, under an embodiment.
Figure 5:
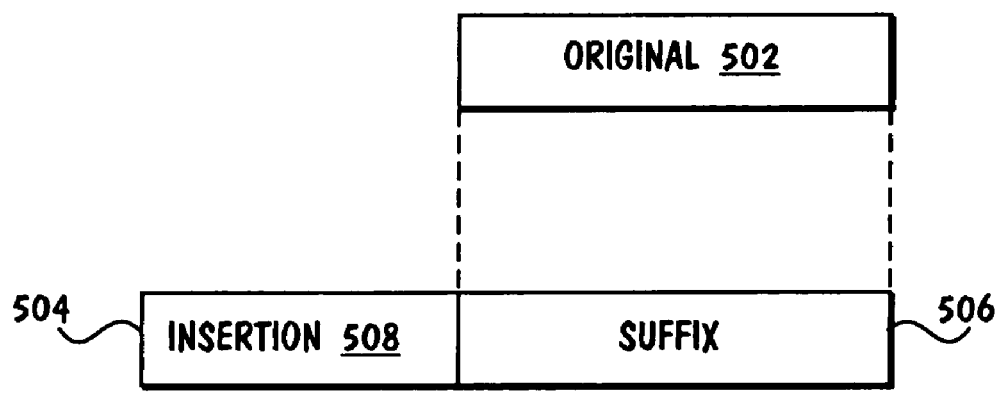
FIG. 5 shows identified insertion data of a new file prefix, under an embodiment.

With regard to determining insertion content 306, and following receipt of the new and original byte streams 302, the pre-processing algorithm of an embodiment identifies the longest common prefix and the longest common suffix of the original byte stream and the new byte stream 304. With reference to FIG. 4, a comparison is next performed to determine if the original byte stream 402 is the prefix 406 of the new byte stream 404; if so then the difference is one insertion 408. The insertion meta-data and insertion content or data are written to the delta file. With reference to FIG. 5, a comparison is also performed to determine if the original byte stream 502 is the suffix 506 of the new byte stream 504; if so then the difference is one insertion 508, and the insertion meta-data and content are written to the data file.

Figure 6:
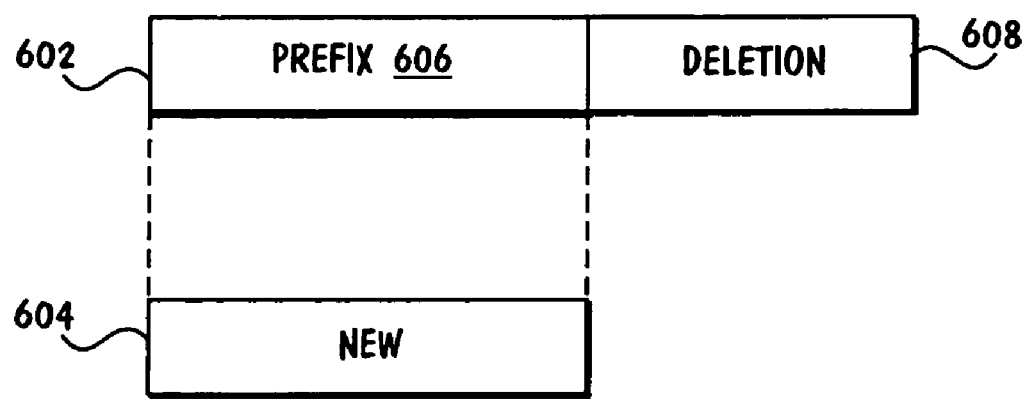
FIG. 6 shows identified deletion data of an original file suffix, under an embodiment.
Figure 7:
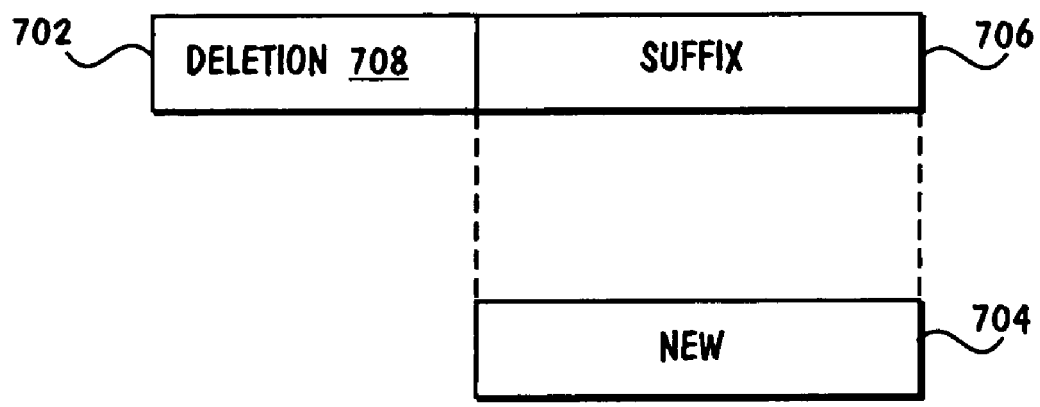
FIG. 7 shows identified deletion data of an original file prefix, under an embodiment.

In determining deletion content 308, operation again begins by identifying the longest common prefix and the longest common suffix of the original and new byte streams. With reference to FIG. 6, a comparison is next performed to determine if the new byte stream 604 is the prefix 606 of the original byte stream 602; if so then the difference is one deletion 608, and the deletion meta-data is written to a file. Further, with reference to FIG. 7, a comparison is performed to determine if the new byte stream 704 is the suffix 706 of the original byte stream 702; if so then the difference is one deletion 708, and the deletion meta-data is written to a file.

Figure 8:
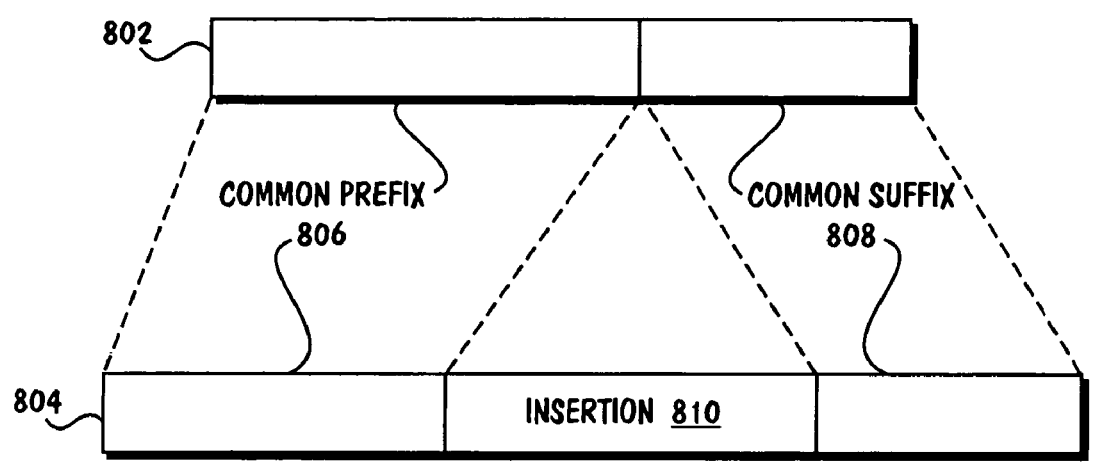
FIG. 8 shows identified insertion data of a new file, under an embodiment.
Figure 9:
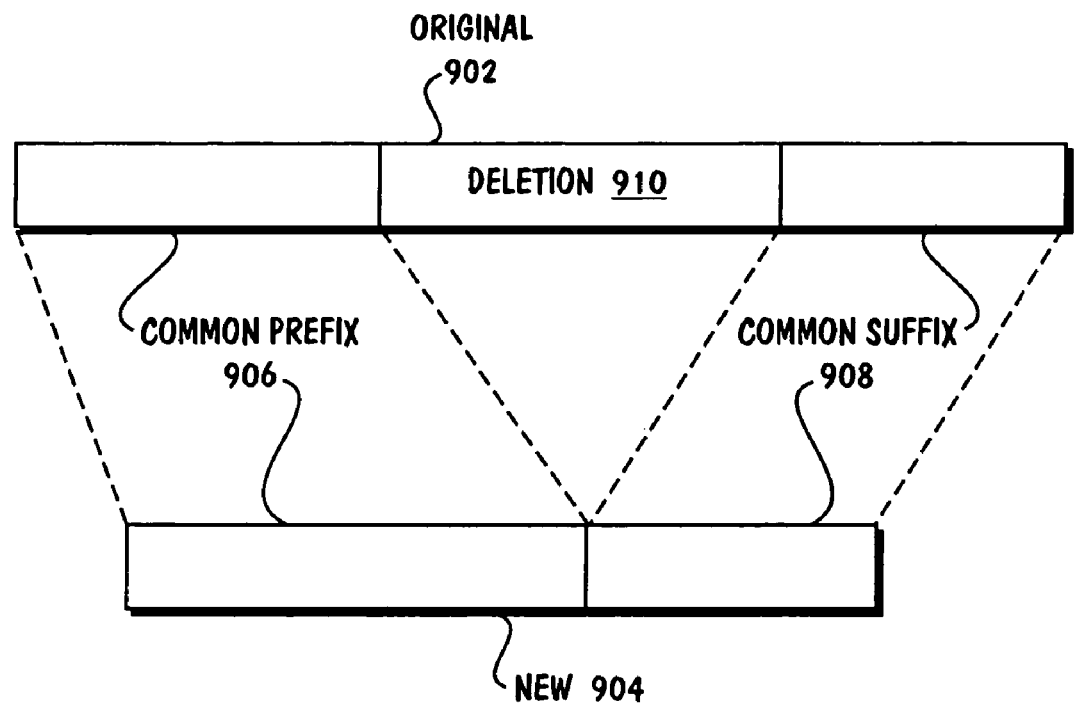
FIG. 9 shows identified deletion data of an original file, under an embodiment.

As for concatenations, the special cases of insertion and deletion, the pre-processing algorithm of an embodiment begins by using the identified longest common prefix and suffix of the original and new byte streams. With reference to FIG. 8, if the original byte stream 802 is the concatenation of the longest common prefix 806 and the longest common suffix 808, then there is an insertion 810 in the new byte stream 804 between the prefix 806 and suffix 808. The metadata and content of this identified insertion are both written to a file. With reference to FIG. 9, if the new byte stream 904 is the concatenation of the longest common prefix 906 and the longest common suffix 908, then there is only a deletion 910 in the original byte stream 902 between the prefix 906 and suffix 908, and the deletion meta-data is written to a data file.

In response to the operations above on the original and new byte streams to determine insertion and deletion content, the pre-processing algorithm returns additional information regarding the differences 310. This information includes, but is not limited to, information as to where the differences start in the two byte streams, and the sizes of the two sub-streams of the original byte streams without the longest common prefix and the longest common suffix.

As one example of the pre-processing of an embodiment, consider the original byte stream
    abcatsrst
and the new byte stream
    abdailyrst.
By eliminating the longest common prefix "ab" and the longest common suffix "rst," the two sub-streams remaining for processing by the file differencing algorithm are reduced to "cats" and "daily" respectively.

Following pre-processing operations, the file differencing algorithm calculates edit distances between the compared byte streams. The edit distance between two byte streams, as described by D. Gusfield in "Algorithms on Strings, Trees, and Sequences: Computer Science and Computational Biology," ("the Gusfield reference") Cambridge (1997), is the minimum number of edit operations needed to transform the original byte stream into the new byte stream. The edit operations of an embodiment include insertions, deletions and substitutions or replacements. The edit operations used to transform the original byte stream into the new byte stream are expressed with an operation array including the symbols "I" (one byte insertion), "D" (one byte deletion), "R" (one byte replacement), and "M" (one byte match). An example is now described.

For this example, the original byte stream is "vintner," the new byte stream is "writers," and the associated operation array generated during edit distance calculations is "RIMD-MDMMI." This operation is depicted as

| R | I | M | D | M | D | M | M | I |
|---|---|---|---|---|---|---|---|---|
| v |   | i | n | t | n | e | r |   |
| w | r | i |   | t |   | e | r | s. |

Applying the operation array to the original byte stream to generate the new byte stream begins with a replacement (R) of the first byte "v" of the original byte stream with a new byte "w" in the new byte stream. The second operation performed on the original byte stream is an insertion (I) of a new byte "r". The third element of the operation array indicates a match (M), so the original byte "i" is copied in the new byte stream. The fourth operation is a deletion (D), resulting in the deletion of byte "n" in the new byte stream. The fifth operation indicates another match (M), so the original byte "t" is copied in the new byte stream. The sixth operation is another deletion (D), resulting in the deletion of byte "n" in the new byte stream. The seventh operation is another match (M), so the original byte "e" is copied into the new byte stream. The eighth operation is yet another match (M), so the original byte "r" is copied into the new byte stream. The ninth operation performed on the original byte stream is an insertion (I) of a new byte "s" into the new byte stream.

The file differencing algorithm that generates the operation array under an embodiment is based on two algorithms known in the art. One of these algorithms is Hirschberg's linear-space optimal alignment algorithm, as described by D. S. Hirschberg in "A linear space algorithm for computing maximal common subsequences," Comm. ACM 18,6 (1975) 341-343. The other algorithm is Ukkonen's linear-time suffix tree algorithm, as described by E. Ukkonen in "On-line construction of suffix trees," ("the Ukkonen reference") Algorithmica 14(3), 249-260(1995).

The traditional dynamic programming strategy requires O(nm) time and O(nm) space, where n and m are the lengths of the original and new byte streams, respectively. Therefore, if the lengths are approximately 32K bytes, O(1 G) bytes of memory are required to build the dynamic programming table in memory. But it is quite common that the limiting resources in byte stream difference calculation problems include both time and space. Daniel Hirschberg developed a practical space reduction method that works for many dynamic programming problems. The Hirschberg algorithm reduces the required space from O(nm) to O(min(n, m)) while only doubling the worst case time bound. If the size of the byte streams are approximately 1M bytes, only O(1M) bytes of working space is needed in memory and the recursive level of this divide-and-conquer scheme is approximately $\log_2(1M)=20$, as described by T. Cormen, C. Leiserson, and R. Rivest in "Introduction to Algorithms," The MIT Press(1 990). This is reasonable for current computing environments where available memory is up to O(1G) and default stack size is O(1M).

A suffix tree, or position tree, is a data structure that exposes the internal structures of a string by explicitly enumerating all its possible suffixes, as described in the Gusfield reference. The most important structure of interest in the context of the file differencing algorithm of an embodiment is the longest repeated sub-string in a stream. More specifically, it is the longest common sub-string (LCS) between two given byte streams. For example, "abc" is the LCS between "axababcdij" and "abiabc". A linear-time algorithm is described in the Ukkonen reference for constructing a suffix tree for any given string. Implementing the Ukkonen algorithm, however, involves several considerations.

The first consideration involves the fact that the byte stream is usually a binary file so, in most cases, all characters from 0 to 255 occur in the byte stream. This requires special attention be paid to the special marker used in the algorithm. The special marker is defined to be a character that does not occur in the byte stream. One method deals with this by using the location where this special marker is supposed to occur to modify the algorithm.

As for the second consideration, the purpose of using the Ukkonen algorithm is to find the LCS between two given byte streams. Therefore, a generalized suffix tree must be constructed by building a suffix tree for the concatenation of the two given byte streams with the addition of the special markers to terminate them.

In addressing the third consideration involved with use of the Ukkonen algorithm, the levels of the suffix tree depend on the size and structure of the given byte stream. Recursively traversing the suffix tree to build the tree, to collect key information, or to free the tree, can result in running out of the process stack, even if a large stack size (e.g., 64 MB) is reserved. Therefore, the recursive tree traversing functions are decoded using a "while loop" instead of recursion.

A fourth consideration involves the edge-label compression scheme described in the Gusfield reference. This compression scheme is recommended for use in achieving linear space complexity; otherwise, processing of larger byte streams might exhaust the available system memory.

As described above, the Hirschberg algorithm can be used to compute the optimal edit distance between the original byte stream and the new byte stream in linear space and quadratic time. If the stream size is small, usually less than several kilobytes, the optimal edit distance can generally be calculated in a reasonable amount of time. However, if the stream size is not less than thousands of bytes, the time required for the Hirschberg algorithm to compute the optimal edit distance is so long (hours, days, and sometime months) as to make it impractical. Because the new byte stream is typically the modification of the original byte stream, the two byte streams will have many portions in common. Quick identification of the common portions of the byte streams allows the algorithms described herein to operate efficiently and quickly by focusing the difference calculations on smaller byte streams.

Figure 10:
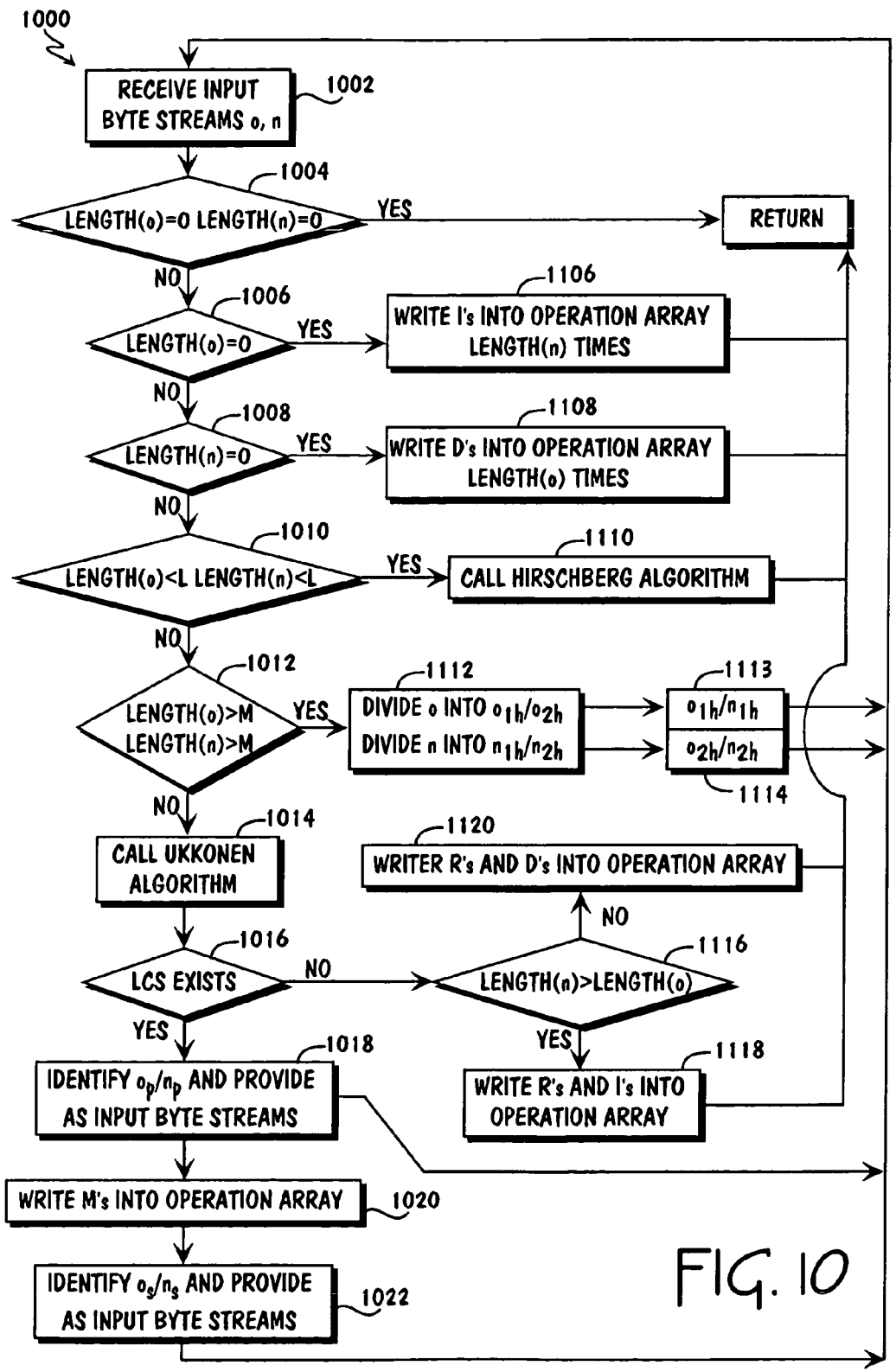
FIG. 10 is a flow diagram of a byte-level file differencing algorithm, under the embodiment of FIG. 1.

FIG. 10 is a flow diagram 1000 of a file differencing algorithm, under an embodiment. The file differencing algorithm computes the edit distance between two input byte streams, and generates and saves the result in an operation array. The file differencing algorithm of an embodiment identifies the LCS between the original and the new byte streams since the LCS is the largest unmodified part in the original byte stream. This can be done in linear-time and linear-space using the Ukkonen algorithm. A divide-and-conquer strategy is then applied. Once the LCS is found, the old and new byte streams are divided into four smaller byte streams. This scheme is applied recursively until the sizes of the old and new byte streams are less than the size for which the Hirschberg algorithm can be invoked, at which point the Hirschberg algorithm is invoked to compute the edit distance between the byte streams. The results are recorded in a global operation array.

The symbology of FIG. 10 includes reference character "L" to represent the maximum number of bytes of a byte stream for which the Hirschberg algorithm can be invoked, e.g. 4096. Reference character "M" represents the maximum number of bytes in an input byte stream for which the difference calculation can be finished in a tolerable time, or something less than approximately two hours. The tolerable time is pre-specified. When an input byte stream exceeds M bytes, the file differencing algorithm will break it into portions, and the portions are halves under one embodiment, but are not so limited. The size M may be dozens of megabytes.

Continuing with a description of symbology, $o_{1h}$ and $o_{2h}$ represent the first and second half of the original byte stream, or byte stream o, respectively, while $n_{1h}$ and $n_{2h}$ represent the first and second half of the new byte stream, or byte stream n, respectively. As such, these representations satisfy $$o_{1h}+o_{2h}=o, \text{ and}$$

$$n_{1h}+n_{2h}=n.$$

The characters $o_p$ and $o_s$ represent the prefix and suffix of byte stream o, respectively, and satisfy $$o_p+LCS+o_s=o.$$

The characters $n_p$ and $n_s$ represent the prefix and suffix of byte stream n, respectively, and satisfy $$n_p+LCS+n_s=o.$$

In addition, "length(o)" represents the length of the byte stream o.

The following pseudo-code is provided as the high-level description of one example of that used by the file differencing algorithm. In this example, "o" represents the original byte stream, "n" represents the new byte stream, and "op_array" represents the operation array.

---

Procedure GETDIFF(o, n, op_array)
  Begin
    If length(o) and length(n) are zero, return;
    If length(o) is zero, write I's into op_array length(n) times, return;
    If length(n) is zero, write D's into op_array length(o) times, return;

-continued

```
If length(o) < L and length(n) < L, call Algorithm Hirschberg, return;
If length(o) > M and length(n) > M,
    cut o into the first half o_{1h} and the second half o_{2h};
    cut n into the first half n_{1h} and the second half n_{2h};
    GETDIFF(o_{1h}, n_{1h}, op_array);
    GETDIFF(o_{2h}, n_{2h}, op_array);
    return;
Call Algorithm Ukkonen to get the LCS;
If no LCS exists and length(o) < length(n),
    write R's and I's into op_array, where the number of
    'R' is length(o), the number of 'I' length(n)-length(o), return;
else if no LCS exists and length(o) >= length(n),
    write R's and D's into op_array, where the number of
    'R' is length(n), the number of 'D' length(o)-length(n), return;
    GETDIFF(o_p, n_p, op_array);
    Write M's into op_array length(LCS) times;
    GETDIFF(o_s, n_s, op_array);
End
```

With reference to FIG. 10, operation begins with receipt of the original and new byte streams by the file differencing algorithm, at block 1002. The file differencing algorithm determines, at block 1004, if the length of both input byte streams is equal to zero; if the lengths equal zero, then the procedure returns.

If east one of both input byte streams is not empty, the file differencing algorithm evaluates the length of the byte streams separately, evaluating the length of the original byte stream at block 1006, and evaluating the length of the new byte stream at block 1008. When the length of the original byte stream equals zero it indicates that the new byte stream contains all new information. Therefore, the file differencing algorithm writes insertion operations ("I") into the operation array length(n) times, at block 1106. The procedure then returns.

Operation, at block 1008, evaluates the scenario where the old byte stream is not empty while new byte stream is empty. When the length of the new byte stream equals zero it indicates that all data of the original byte stream is to be deleted. Therefore, the file differencing algorithm writes deletion operations ("D") into the operation array length(o) times, at block 1108. The procedure then returns.

Operation continues at block 1010 when both input byte streams have a length greater than zero, where the file differencing algorithm evaluates the length of both byte streams. If the length of each input byte stream is less than L, the maximum number of bytes of a byte stream for which the Hirschberg algorithm can be invoked, then the Hirschberg algorithm is called to calculate the edit distance between the two byte streams, at block 1110. The procedure then returns.

If at least the length of one of the input byte streams is greater than L then operation continues at block 1012. Here, the file differencing algorithm determines if the length of each input byte stream is greater than M, the maximum number of bytes in an input byte stream for which the difference calculation can be finished in a pre-specified or tolerable time. If each input byte stream exceeds M in length, then each byte stream is divided into two halves of approximately equal size, at block 1112. Operation continues by inputting each set of byte stream segments $o_{1h}/n_{1h}$ and $o_{2h}/n_{2h}$ into the file differencing algorithm as input byte streams at blocks 1113 and 1114, respectively.

When the length of the input byte streams is greater than the maximum length for which the Hirschberg algorithm can be invoked and less than the maximum length for which the difference calculation can be finished in a tolerable time, the file differencing algorithm calls a linear-time routine to identify the LCS between the byte streams, at block 1014. The linear-time routine of an embodiment is the Ukkonen algorithm, but the embodiment is not so limited.

If no LCS exists between the two byte streams, at block 1016, then the lengths of the two byte streams are compared, at block 1116. When the length of the new byte stream exceeds that of the original byte stream, then replacement ("R") and insertion ("I") operations are written into the operation array as appropriate, at block 1118, and the procedure returns. When the length of the original byte stream exceeds that of the new byte stream, then replacement ("R") and deletion ("D") operations are written into the operation array as appropriate, at block 1120, and the procedure returns.

Figure 11:
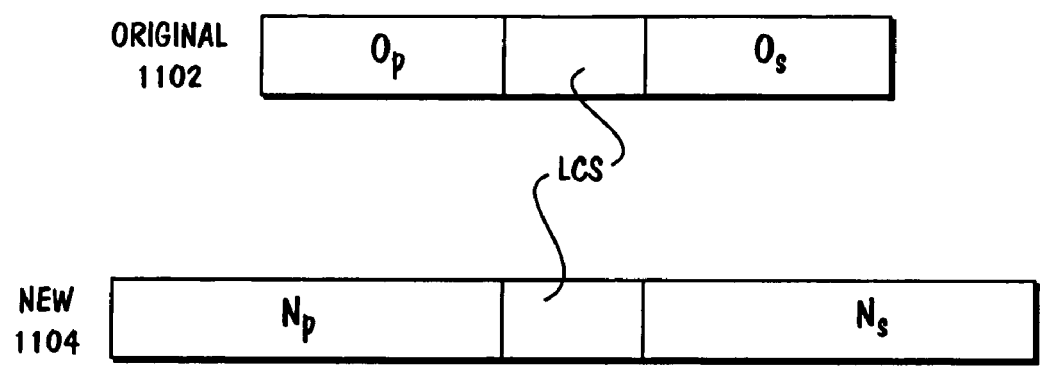
FIG. 11 shows an identified longest common sub-string (LCS) and the associated prefixes and suffixes, under the embodiment of FIG. 10.

When an LCS is identified between the two byte streams, at block 1016, and with reference to FIG. 11, two byte sub-streams are identified for further evaluation, at block 1018. One sub-stream ($o_p$) includes prefix bytes to the LCS of the original byte stream 1102, while the other sub-stream ($n_p$) includes prefix bytes to the LCS of the new byte stream 1104. Operation returns to block 1002, where these two sub-streams ($o_p$ and $n_p$) are provided as inputs to the file differencing algorithm for evaluation.

At block 1020, match ("M") operations are written to the operation array length (LCS) times. Furthermore, two additional byte sub-streams are identified for further evaluation, at block 1022. One sub-stream ($o_s$) includes suffix bytes to the LCS of the original byte stream 1102 while the other sub-stream ($n_s$) includes suffix bytes to the LCS of the new byte stream 1104. Operation returns to block 1002, where these two additional sub-streams ($o_s$ and $n_s$) are provided as inputs to the file differencing algorithm for evaluation.

The flow diagram 1000 of the file differencing algorithm shows the algorithm to work recursively. If the byte streams are of an approximate size O(1M), the recursive levels are $\log_2(1M)=20$. Therefore, it is safe to write recursively without running out of the process stack.

A space, time, and recursive level analysis of the file differencing algorithm of an embodiment is described here. For the space analysis, it is noted that both the Hirschberg and Ukkonen algorithms use linear space. Because the file differencing algorithm of an embodiment calls the Hirschberg and Ukkonen algorithms recursively, the total space complexity is linear with respect to the size of the input byte stream.

With regard to the time analysis, suppose L is the maximum size of byte streams under which the Hirschberg algorithm can be invoked and n is the size of the original input byte streams. In one worst case scenario, the file differencing algorithm calls the Hirschberg algorithm O(n/L) times and the Ukkonen algorithm O($\log_2 n$) times. Therefore, the total time for performance of routines of the file differencing algorithm is no more than $$O(n/L)*O(L*L)+O(\log_2 n)* O(n)=O(n*L).$$

As for the recursive analysis, the tree traversing functions of the file differencing algorithm should be implemented using a "while loop". For byte streams containing approximately 1M bytes, the recursive levels of the file differencing algorithm are approximately 20. If L is the maximum size of the byte streams for which the Hirschberg algorithm can be invoked, the recursive level of the Hirschberg algorithm is $\log_2 L$. If L is less than 1M, the total recursive levels will be approximately 40. Therefore, the default stack size of O(1M), used on most UNIX and Windows platforms, is more than enough to support running of the file differencing algorithm.

The above analysis shows that the file differencing algorithm computes the edit distance in linear space using a default stack size. The computation time is O(n*L). If L=n, the file differencing algorithm degenerates to the Hirschberg algorithm and the optimal edit distance is computed. If L is very small (e.g., 1024) the file differencing algorithm runs in linear time and a quasi-optimal edit distance is computed. Thus, the file differencing algorithm is better in practice than those difference techniques previously known in the art.

After generating the operation array by which the original byte stream is transformed into the new byte stream, a process begins that generates a delta file from the operation array. The size of the delta file should be as small as possible, as described below. The delta file of an embodiment comprises a series of records, and each record includes meta-data along with content data where necessary. Consequently, the meta-data is overhead of sorts, and this overhead should be reduced as much as possible to improve the efficiency of the difference process. To achieve this reduction, the following seven merging and indexing (M&I) techniques are applied in an embodiment to shrink the total meta-data size since the operation array only specifies byte level operations.

A first M&I technique scans the operation array in search of match operations. When single match operations are located they are replaced by substitution operations, because the match operations are special cases of substitution operations. This substitution is also performed on groups of match operations containing no more than three match operations in sequence. A sequence length of three operations is used because the minimum length of a meta-data sequence is three bytes. In this manner, a set of meta-data is enough to record the changes in this part instead of several operations. As an example, the operation array prior to application of the first M&I technique is

```
I I I M M M D D M M M M M R M M D.
1 2 3 4 5 6 7 8 9 10 11 12 13 14 15 16 17 18
```

This array includes two sequences of match operations having a sequence length of three operations or less; a first sequence at positions 4-6 of the array, and a second sequence at positions 16 and 17 of the array. Following application of the first technique these sequences are replaced by sequences of replacement operations, and the operation array becomes

```
I I I R R R D D M M M M M M R R R D.
1 2 3 4 5 6 7 8 9 10 11 12 13 14 15 16 17 18
```

A second M&I technique searches the operation array for sequences of the same operation. This search looks for all operations except match ("M") operations. When these sequences are located they are merged into a single large operation that specifies the operation to be performed along with a length to indicate the number of bytes on which this operation is to be performed. For example, the operation array prior to application of this technique is

```
M M M M D D D D D D D D D D D D D M M M M.
1 2 3 4 5 6 7 8 9 10 11 12 13 14 15 16 17 18 19 20
```

This array contains a sequence of twelve deletion operations between two different sequences of match operations. This technique replaces the sequence of twelve deletion operations with the operation deletion_with_length.

Thus, following application of this technique the operation array becomes

```
M M M M deletion_with_length M M M M,
1 2 3 4                      17 18 19 20
``` where the "length" is specified as being equal to twelve (12).

The third M&I technique merges a sequence of insertion ("I") operations, deletion ("D") operations, and substitution ("R") operations to form one operation, when there is no match ("M") operation in the sequence. This technique includes two variations. A first variation is used when the number of insertion operations equals the number of deletion operations, in which the merged operation is a fixed length replacement operation having a specified length. Otherwise, the second variation is applied, a variable length replacement having two specified lengths, where the operation is specified as variable_length_replace.

The first specified length provides the length of the sequence that is replacing the identified sequence (replacing length), while the second specified length provides the length of the sequence to be replaced (replaced length). For example, the operation array prior to application of this technique is

MMMMRI DDDDDDDDDDDDMMMMM.

This array contains the sequence "RIDDDDDDDDDDDD." This sequence meets the criteria for application of the third M&I technique because it is a sequence of substitution, insertion, and deletion operations. The second variation is applied here because the number of insertion operations (one) is not equal to the number of deletion operations (twelve). Following application of the second variation the operation array becomes MMMMvariable_length_replaceMMMMM, where the replacing length is two (the total number of one-byte replacement operations and one-byte insertion operations) and the replaced length is thirteen (the total number of one-byte replacement operations and one-byte deletion operations).

A fourth M&I technique is provided to take advantage of patterns in which fixed length sequences of replacement operations occur in more than one fixed length sequence of operations, for example match operations. The name of the new operation itself tells the length of replacement, associated with two parameters to tell the interval length and repeat times. This technique is most appropriate when the fixed length replacement in an interval is no more than 30 bytes. The operation array, for example, prior to application of this technique is

MMMMMRRMMMMRRMMMMRRMMMMMII.

This array is seen to include a sequence

RRMMMM that repeats three times. This sequence includes a two-byte sequence of replace operations along with the match operations. Thus, following application of this technique, the operation array becomes MMMMM2_byte_fixed_length_repeat_replaceMII, where 2_byte_fixed_length_repeat_replace replaces

RRMMMMRRMMMMRRMMMM, and the "length" is specified as six (total length of each replace/match sequence), while the "repeat" is three (each replace/match sequence is repeated three times).

Often, a fixed length sequence of replacement operations occurs among fixed length sequences of match operations. A fifth technique introduces a new operation to take advantage of this pattern. The name of the new operation provides the replacement length along with two parameters that specify the interval length and repeat times. An example is described now, where the operation array is

MMMMRRMMMMRRMMMMRRMMMMRRII.

This array includes the sequence

RR repeated four times among fixed length sequences of match operations. Application of this technique produces the operation array MMMM2₁₃byte_fixed_length_int_repeat_replaceII, where the new operation 2_byte_fixed_length_int_repeat_replace replaces the sequence

RRMMMMRRMMMMRRMMMMRR.

The interval "length" in this example equals six (the length of the sequence "RRMMMM"), while the interval "repeat" is specified as four (the sequence "RR" repeats four times).

A sixth M&I technique includes putting all handled operations into a data structure, for example a hash table. When an operation is encountered in the operation array that previously occurred in the operation array, a new operation is introduced that operates to insert the previously encountered operation at the new location. The new operation is exact_copy_index_to, along with an offset parameter that indicates the location of the copy.

When the byte streams are executables, one instruction insertion or deletion causes the addresses of the subsequent instructions to shift a constant value. A seventh M&I technique introduces a new operation that takes advantage of this pattern. The new operation is address_repeat_shift, and the repeat times and interval length of this operation are associated with the operation as meta-data, while the constant value remains as real data.

In the communication environment, the size of data files transmitted to devices should be as small as possible in order to maximum efficiency in the transfer process and minimize errors associated with file transfer or transmission. Thus, following the merging and indexing of the operation array, the file differencing algorithm of an embodiment minimizes the size of the delta file by reducing the redundant information of the operation array during the writing of the operation array to the delta file. This reduction in redundant information is performed using a variable length integer format to write the operation array to the delta file, but the embodiment is not so limited. In addition to the variable length integer format, relative start addresses are used in the operation array to indicate where modifications to byte streams occur instead of absolute start addresses.

A description of the variable length integer format of an embodiment begins with a description of how integer values are stored in a delta file. The length of the byte stream representing an unsigned integer depends on the integer value. An integer with a value between 0 and 127 can be represented using one byte. If the integer value is between 128 and 16,383, the integer can be represented with two bytes. An integer value between 16,384 and 2,097,151 is represented with three bytes. An integer having a value greater than 2,097,151 requires four or more bytes.

For storage purposes, an integer value of an embodiment is converted into a character string of the form CIIIIIII CIIIIIII ... CIIIIIII,
1 2 3 4 5 6 7 8 1 2 3 4 5 6 7 8    1 2 3 4 5 6 7 8 where "CIIIIIII" represents 8 bits of one byte. The first bit of a byte (the "C" bit) is referred to as a continuous bit. The continuous bit indicates whether more bytes follow the associated byte to be read as part of the current integer. Therefore, if C is a "1" then the following byte should be read as part of the current integer. If C is a "0" the integer ends with the current byte. Thus, this string format representing an unsigned integer is called a variable length integer format.

As described above with reference to communications systems, the size of files transmitted among devices, for example the delta file, should be as small as possible. Suppose there are 1000 integers, whose values are between 0 and 127, to be stored in the delta file. If four bytes are consumed for each integer, 4000 bytes are needed. In most cases, the integers used by the algorithms provided herein describe offsets, pattern repeat times, operating lengths, and other characteristics of byte stream differences. Therefore, the values of these integers are typically less than 16,383. Thus, on average approximately 1000 bytes are enough to store the typical integers used by the file differencing algorithm if the variable length integer format provided herein is used. The resulting savings of approximately 3000 bytes means that reservation of four bytes to represent each unsigned integer, regardless of integer value, is a waste. Use of the variable length integer format provided herein, thus, reduces the size of the space needed for integer storage in the delta file by 50% to 75%.

Figure 12:
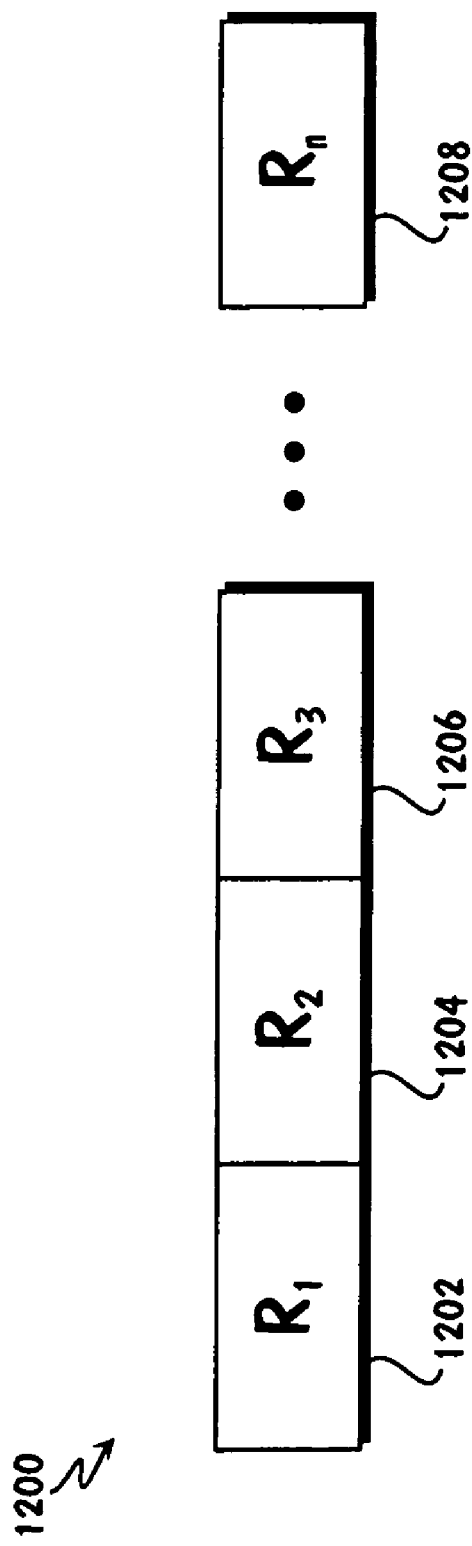
FIG. 12 is a block diagram of a delta file including a concatenation of a series of records, under an embodiment.

FIG. 12 is a block diagram of a delta file 1200, under an embodiment. The delta file format generally includes a concatenation of a series of records 1202-1208.

Figure 13:
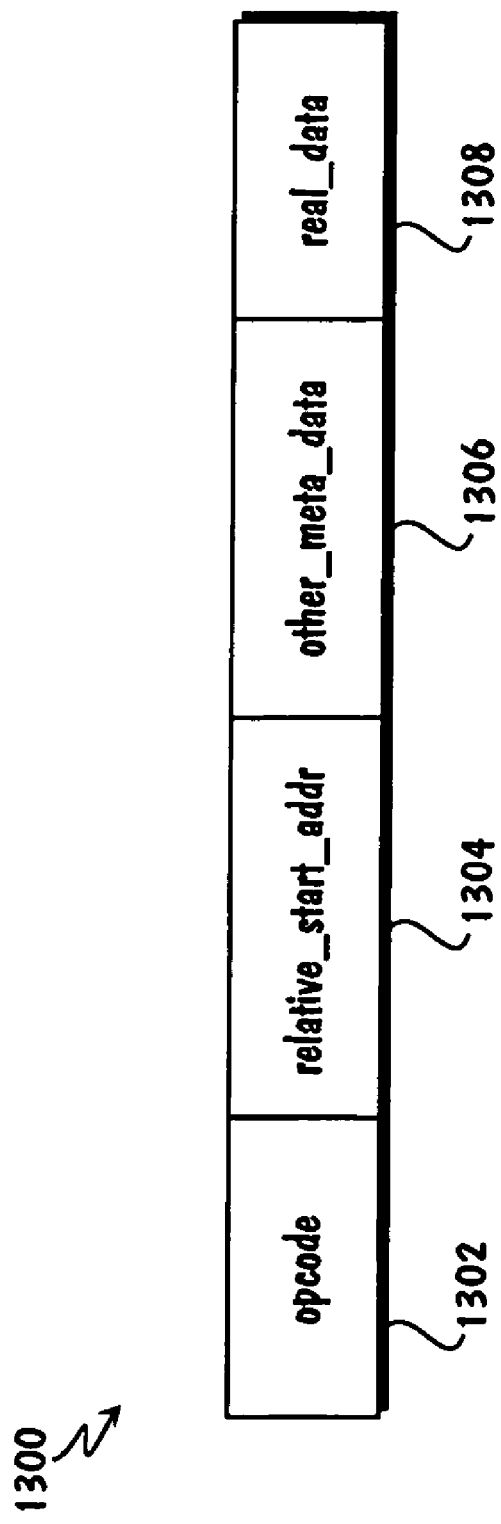
FIG. 13 is a block diagram of a delta file record, under the embodiment of FIG. 12.

FIG. 13 is a block diagram of a delta file record 1300, under the embodiment of FIG. 12. FIG. 14 is a table including operation descriptions, under the embodiment of FIG. 13. With reference to FIGS. 13 and 14, in this example, the format of each record is opcode+relative_start_addr+[other_meta_data]+
[real_data].

The "+" symbol represents concatenation of the listed fields. The "opcode" record 1302 is one byte that provides the operation code.

The "relative_start_addr" record 1304 provides the relative start address where the current modification occurs. If this record 1304 is the first record then the "relative_start_addr" record 1304 represents the offset relative to the beginning of the new byte stream, otherwise it represents the difference between the current absolute start address and the absolute start address in the last record. With this scheme, it is easy to compute the absolute start address for the current modification. The advantage is that smaller integers are stored in the delta file instead of larger integers. Use of the variable length integer format, therefore, saves thousands of bytes when the delta file includes thousands of records.

The "other_meta_data" record 1306 represents any of the following fields, depending on the operation code, but is not so limited: operating_len 1306a, operated_len 1306b, repeat_times 1306c, interval_length 1306d, and delta_offset 1306e. The "real_data" record 1308 is the shift value for the opcode "address_repeat_shift," or the actual replacement or insertion data. The brackets "[ ]" indicate the included field is optional, depending on the operation code.

While up to 256 operation codes can be defined, a study of the patterns of the differences encountered among byte streams leads to introduction of the following operation codes in an embodiment. FIGS. 15A, 15B, 15C, 15D and 15E show a summary table of operation codes along with associated fields, introduced under an embodiment.

A record format with a brief description follows for each of the operation codes;

INSERTION opcode: this is an insertion operation. The record format is:

opcode+relative_start_addr+operating_len+real_data.

The opcode is INSERTION while the "operating_len" and "real_data" fields provide the length of the insertion and the insertion data. The "operating_len" field is in the variable length integer format described above. If operating_len is no more than 10, the following opcodes are introduced to save 1 byte for each record.

ONE_BYTE_INSERTION,
TWO_BYTE_INSERTION,
THR_BYTE_INSERTION,
FOU_BYTE_INSERTION,
FIV_BYTE_INSERTION,
SIX_BYTE_INSERTION,
SEV_BYTE_INSERTION,
EIG_BYTE_INSERTION,
NIN_BYTE_INSERTION,
TEN_BYTE_INSERTION.

These are small-scale insertion operations (no more than 10 bytes). The record format is:

opcode+relative_start_addr+real_data.

The insertion length is implied by the opcode.

DELETION opcode: this is a deletion operation. The record format is:

opcode+relative_start_addr+operated_len.

The opcode is DELETION while the "operated_len" field, in variable length integer format, indicates the length of the deletion. If operating_len is no more than 10, the following opcodes are introduced to save 1 byte for each record.

ONE_BYTE_DELETION,
TWO_BYTE_DELETION,
THR_BYTE_DELETION,
FOU_BYTE_DELETION,
FIV_BYTE_DELETION,
SIX_BYTE_DELETION,
SEV_BYTE_DELETION,
EIG_BYTE_DELETION,
NIN_BYTE_DELETION,
TEN_BYTE_DELETION.

These are small-scale deletion operations (no more than 10 bytes). The record format is:

opcode+relative_start_addr.

The deletion length is implied by the opcode.

REPLACEMENT opcode: this is a same length replacement operation. The record format is:

opcode+relative_start_addr+operating_len+real_data.

The opcode is REPLACEMENT while the "operating_len" and "real_data" fields indicate the length of the replacement and the replacement data. The "operating_len" field is in variable length integer format. If operating_len is no more than 20, the following opcodes are introduced to save 1 byte for each record.

ONE_BYTE_REPLACEMENT,
TWO_BYTE_REPLACEMENT,
THR_BYTE_REPLACEMENT,
FOU_BYTE_REPLACEMENT,
FIV_BYTE_REPLACEMENT,
SIX_BYTE_REPLACEMENT,
SEV_BYTE_REPLACEMENT,
EIG_BYTE_REPLACEMENT,
NIN_BYTE_REPLACEMENT,
TEN_BYTE_REPLACEMENT;
T11_BYTE REPLACEMENT;
T12_BYTE REPLACEMENT;
T13_BYTE REPLACEMENT;
T14_BYTE REPLACEMENT;
T15_BYTE REPLACEMENT;
T16_BYTE REPLACEMENT;
T17_BYTE REPLACEMENT;
T18_BYTE REPLACEMENT;
T19_BYTE REPLACEMENT;
T20_BYTE REPLACEMENT.

These are small-scale replacement operations (no more than 20 bytes). The record format is:

opcode+relative_start_addr+real_data.

The replacement length is implied by the opcode.

VARIABLE LEN REPLACEMENT opcode: this is a variable length replacement operation.

The record format is:

opcode+relative_start_addr+operating_len+operated_len+real_data.

The opcode is VARIABLE_LEN_REPLACEMENT while the "operating_len," "operated_len" and "real_data" fields provide the replacing length, the replaced length, and the actual replacing data, respectively. The "operating_len" and "operated_len" fields are in variable length integer format.

EXACT COPY INDEX TO opcode: this indicates that the current operation occurs somewhere previously in the byte stream. The record format is:

opcode+relative_start_addr+delta_offset.

The opcode is EXACT_COPY_INDEX_TO while the "delta_offset" field, in variable length integer format, is the offset in the delta file where the record of the copied operation is found.

WHOLE REPLACEMENT opcode: this is a whole replacement operation. The record format is:

opcode+real_data.

The opcode is WHOLE_REPLACEMENT. The "relative_start_addr" field does not appear here since it defaults to a value of "0". The "real_data" field is all the bytes in the new byte stream.

ADDRESS REPEAT SHIFT opcode: this is a multi-one-byte address shift operation. The record format is:

opcode+relative_start_addr+repeat_times+interval_len+real_data.

The opcode is ADDRESS_REPEAT_SHIFT while the "repeat_times" and "interval_len" fields provide the repeat times and the interval length. The real_data includes the actual address shift, a one-byte character signaling the shift value. The "repeat_times" and "interval_len" fields are in variable length integer format.

SAME ADDRESS REPEAT SHIFT opcode: this is a multi-one-byte address shift operation, but the shift value is implied by previous ADDRESS_REPEAT_SHIFT record. Therefore one byte is saved comparing to previous record. The record format is:

opcode+relative_start_addr+repeat_times+interval_len.

The opcode is SAME_ADDRESS_REPEAT_SHIFT while the "repeat_times" and "interval_len" fields provide the repeat times and the interval length. The "repeat_times" and "interval_len" fields are in variable length integer format.

All other opcodes: the other opcodes take advantage of patterns of operations found in operation arrays, for example short length operation sequences occurring repeatedly in fixed length intervals. One example of such sequences includes
RRMMMMRRMMMMRRMMMM.
The opcode used for this pattern is
TWO_BYTE_FIX_LEN_REPEAT_REPLACE,
indicating a two-byte fixed length repeating sequence of replacement operations ("RR"). Another example is the sequence
RRMMMMRRMMMMRRI
The opcode used for this pattern is
TWO_BYTE_FIX_LEN_REPEAT_REPLA-
CE_END_NO_M,
indicating a two byte fixed length repeating sequence of replacement operations ("RR"), where the sequence does not end with a match operation. With reference to these other operation codes and these examples, in each interval, the replacement length is no more than thirty bytes. The record format is opcode+relative_start_addr+repeat_times+
interval_len+real_data.

The "repeat_times" and "interval_len" fields provide the repeat times and the interval length. The "real_data" field is the concatenation of the replacement data in each interval. The "repeat_times" and "interval_len" fields are in the variable length integer format described above.

An example is presented below to illustrate delta file generation from two input byte streams, as described in detail above. In this example, the two input byte streams include an old byte stream and a new byte stream. The old byte stream is
55555121212delet121212replaced14141414141414fix-
lenreplace999999999,
and the new byte stream is
55555insertion121212121212REPLACING1414141414-
1414FIXLENREPLACE999999 999.
The old and new byte streams are pre-processed, as described above, producing an old byte stream input to the file differencing algorithm that is
121212delet121212replaced14141414141414fixlenreplace,
and a new byte stream input to the file differencing algorithm that is
insertion121212121212REPLACING14141414141414-
FIXLENREPLACE.
The operation array corresponding to these two byte streams is
IIIIIIIIIMMMMMMDDDDDMMMMMMIR-
RRRRRRRMMMMMMMMMMMMMM
RRRRRRRRRRRRRR.

Generation of the delta file proceeds, as described in detail above, and the resulting delta file includes four records. The first delta file record is
opcode NIN_BYTE_INSERTION
relative_start_addr 5
real_data insertion.
This first record includes eleven bytes. The second delta file record is
opcode FIV_BYTE_DELETION
relative_start_addr 6,
and includes two bytes. The third delta file record is
opcode VARIABLE_LEN_REPLACEMENT
relative_start_addr 6
operating_len 9
operated_len 8
real_data REPLACING.
This third record includes thirteen bytes. The fourth delta file record is
opcode T13_BYTE_REPLACEMENT
relative_start_addr 23
real_data FIXLENREPLACE.
This fourth delta file record includes fifteen bytes. Therefore, the total size of this delta file before compression is the sum total of each of the four delta file records, or forty-one bytes.

Following generation of the delta file, additional operations may be performed in an embodiment to further increase the efficiency of delta file transfer to another system. For example, compression may be used to further reduce the size of the delta file for transmission. Because the associated decompression module may be hosted on a processor-based device having limited resources, the compression algorithm used should be one that provides a file capable of being decompressed using an algorithm that executes as fast as possible on pre-allocated memory. That is, the decompression algorithm should not allocate memory dynamically. While compression does not always result in a further reduction in delta file size, the delta file uses specified bytes to indicate when the file is compressed.

The file differencing algorithm of an embodiment uses some mechanism such as checksum error correction coding to detect any corruption of a transmitted delta file, but is not so limited. One simple checksum scheme is as follows. The length of the checksum is one byte, and the checksum is placed at the end of the delta file. The checksum is the two's complement of the byte that represents the sum of all the bytes in the delta file except the last one. In this way, summing all the bytes in an error-free delta file provides a result equal to zero.

Following generation, delta files of an embodiment are stored for future downloading to other computer systems for use in updating copies of original files hosted on the other computer systems. Referring to FIG. 1, once the delta file 116 is received via some transmission media 106 at the receiving computer system 104, the file updating algorithm 118 is called.

Figure 16:
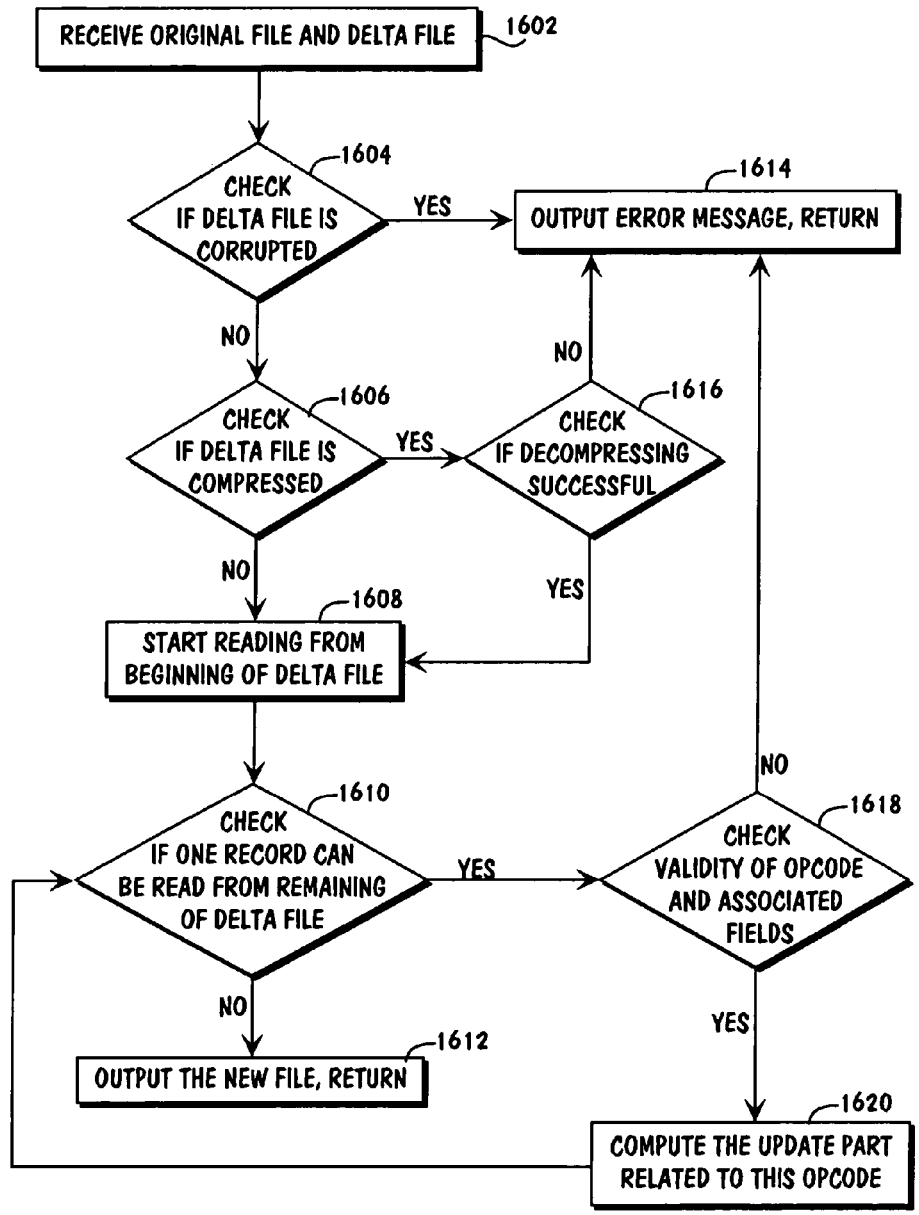
FIG. 16 is a flow diagram of a byte-level file updating algorithm, under an embodiment.

FIG. 16 is a flow diagram for generating a new file using the corresponding original file and the delta file, under an embodiment. Upon receiving the original file and the delta file, at block 1602, the file updating algorithm checks the delta file for corruption or errors using basic techniques such as checksum, at block 1604. If the delta file is corrupt, an output error message is generated, at block 1614, and operation returns.

If the delta file is free of errors, the file updating algorithm determines whether the delta file is compressed, at block 1606. This determination is made using a designated byte or designated bytes of the delta file. If the delta file is compressed and the compression method is known, then the file updating algorithm decompresses the delta file. Following decompression the file updating algorithm determines whether the decompression was successful, at block 1616. If the decompression is not successfully completed, an output error message is generated, at block 1614, and operation returns. If the decompression is successfully completed, reading of the delta file begins, at block 1608.

As reading commences from the delta file, at block 1608, the file updating algorithm uses the pre-defined delta file format as protocol to parse and understand the differences implied in the delta file and creates the new version of file with 100% accuracy. As each record of the delta file is read, the file updating algorithm determines whether additional records are available for reading from the delta file, at block 1610. If additional records are available and read, the file updating algorithm checks the validity of the opcode and the associated fields of the record, at block 1618. When the opcode or any of the additional fields are deemed to be invalid, or if any errors are encountered in the updating process such as an unknown opcode, an output error message is generated to signal an update failure, at block 1614, and operation returns.

When the opcodes and associated fields are valid, the file updating algorithm generates the corresponding portion of the new file, at block 1620; remaining records of the delta file are then read, at block 1610. When no additional records remain to be read from the delta file the new file is provided, at block 1612, and operation returns.

As an example, a description of the file updating algorithm is as follows:

```
Procedure GETUPDATE(o_ptr, n_ptr, delta_file)
  Begin
    If delta_file is corrupted, return the error;
    If delta_file is compressed, do de-compressing;
    Set delta_offset = 0;
    While (delta_offset < delta_file_length) {
      Get opcode;
      Based on the opcode, do the corresponding operation
        including adjusting delta_offset, o_ptr, n_ptr;
      If any error encounters, return the error;
    }
    Output new version file;
  End
```

In this example of the file updating algorithm, o_ptr represents the pointer pointing to the location where the old version of a file is residing, while the n_ptr represents the pointer pointing to the storage location where the new version of a file is going to be saved. Delta_file represents the delta file received through some transmission media. Delta_file_length represents the length of the delta file if it is not compressed, or the uncompressed length of a compressed delta file.

The file updating algorithm of an embodiment works on pre-allocating memory. Further, the file updating algorithm functions very fast on any resource-limited computing device.

As an example, the computing devices receiving and using the delta file may be client devices that host corresponding software applications in need of updating, for example cellular telephones, mobile electronic devices, mobile communication devices, personal digital assistants, and other processor-based devices. This support is provided for all mobile device software ranging from firmware to embedded applications by enabling carriers and device manufacturers to efficiently distribute electronic file content and applications via their wireless infrastructure.

One example of systems that benefit from use of the FDU algorithms includes systems using wired serial connections to transfer the delta file from a device hosting the file differencing algorithm to a device hosting the file updating algorithm. These systems typically have slow transfer rates (currently about 192 kbits/second). Because the transfer rates are slow, a reduction in the size of the delta file is a way to realize faster transfer times. Thus, use of the FDU algorithms in these serial transfer systems increases user satisfaction.

Another example of systems that benefit from use of the FDU algorithms includes wireless systems using radio communications to transfer the delta file from a device hosting the file differencing algorithm to a device hosting the file updating algorithm. While suffering from low reliability associated with the wireless connections, these systems also have slow transfer rates (currently about 9.6 to 64 kbits/second). The use of a smaller delta file in these systems provides several advantages. For example, the smaller file size results in a faster delta file transfer time. The faster transfer time, while saving time for the device user, reduces the opportunity for the introduction of errors into the delta file, thereby increasing system reliability. Also, with cellular communications, the reduced transfer time results in a cost savings for the consumer who is typically charged by the minute for service.

As another advantage, the smaller delta file reduces the bandwidth required to transfer the delta files to client devices. The reduced bandwidth allows for the support of more client devices via the allocated channels. As with the reduced transfer time, this too results in a reduction in operating costs for the wireless service provider.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing systems and communication systems, not only for the FDU algorithms described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional

What we claim is:

1. A system for updating electronic files, the system including
a memory;
a processor processing at least one application, wherein the processor is configured to:
receive two byte streams including byte streams corresponding to an original file and a new file;
determine a longest common sub-string (LCS) between the two byte streams;
divide each of the two byte streams into a plurality of sub-streams, and when the LCS is at least a first pre-specified size, recursively determine another LCS between at least two sub-streams of the plurality of sub-streams and re-divide each sub-stream until a size of the sub-streams is less than a second pre-specified size, wherein the second pre-specified size of the sub-streams is proportional to computation time of byte-level differencing between sub-streams of the plurality of sub-streams;
determine a byte-level difference between each of the corresponding sub-streams; and
generate a delta file that includes the byte-level difference.

2. The system of claim 1, wherein a first sub-stream of the plurality of sub-streams is a prefix to the respective LCS.

3. The system of claim 1, wherein a second sub-stream of the plurality of sub-streams is a suffix to the respective LCS.

4. The system of claim 1, wherein the new file includes updated and revised versions of the original file.

5. The system of claim 1, wherein the processor is configured to structure the delta file using a set of operation codes and a variable length integer format that eliminates redundant information in the delta file.

6. The system of claim 5, wherein the variable length integer format uses one bit of a byte to indicate whether a following byte is read as part of an integer.

7. The system of claim 1, wherein the processor is configured to generate an operation array that codes the determined byte-level differences.

8. The system of claim 7, wherein the processor is configured to merge operations of the operation array to reduce an amount of meta-data.

9. The system of claim 7, wherein the processor is configured to write the operation array to the delta file.

10. The system of claim 9, wherein the processor is configured to write the operation array using relative start addresses to identify locations of byte stream modifications.

11. The system of claim 7, wherein the processor is configured to, in the absence of an LCS between two byte streams or between two sub-streams, write replacement operations and deletion operations into appropriate locations of the operation array when a length of the byte stream corresponding to the new file is less than a length of the byte stream corresponding to the original file.

12. The system of claim 7, wherein the processor is configured to, in the absence of an LCS between two byte streams or between two sub-streams, write replacement operations and insertion operations into appropriate locations of the operation array when a length of the byte stream corresponding to the new file is greater than a length of the byte stream corresponding to the original file.

13. The system of claim 7, wherein the processor is configured to merge operations of the operation array by locating short sequences of match operations in the operation array and replacing the match operations of the short sequence with substitution operations.

14. The system of claim 13, wherein the short sequences include three or less sequential match operations.

15. The system of claim 7, wherein the processor is configured to merge operations of the operation array by locating sequences of operations other than match operations in the operation array and replacing the located sequences with a single operation specifying a type of the operation and a length of the sequence.

16. The system of claim 7, wherein the processor is configured to merge operations of the operation array by locating sequences including at least one combination of insertion, deletion, and substitution operations and replacing the sequences with a single variable length replacement operation.

17. The system of claim 7, wherein the processor is configured to merge operations of the operation array by locating sequences including an equal number of insertion and deletion operations and replacing the sequences with a single fixed length replacement operation.

18. The system of claim 7, wherein the processor is configured to merge operations of the operation array by locating a unit of operations that repeats in a pattern and replacing the repeating unit with a single operation specifying a length of the sequence of replacement operations, a length of the unit, and a number of times the unit repeats in the pattern.

19. The system of claim 18, wherein the unit includes a fixed-length sequence of replacement operations and a fixed-length sequence of another type of operation.

20. The system of claim 7, wherein the processor is configured to merge operations of the operation array by placing operations appropriate to the operation array into a hash table and using a single copy operation including an offset parameter, wherein the copy operation inserts operations at the appropriate locations in the operation array using information of the hash table.

21. The system of claim 1, wherein a format of the delta file comprises a concatenation of a series of records selected from among an operation code, a relative start address of the new file at which the operation code is to be applied, and data of an insertion or replacement to the original file where necessary.

22. The system of claim 1, wherein the processor is configured to halve each of the two byte streams upon determining that the byte streams are longer than a maximum size.

23. The system of claim 1, wherein the processor is configured to compress the delta file.

24. The system of claim 1, wherein the processor is configured to apply error correction coding to the delta file.

25. The system of claim 1, wherein the processor is configured to transmit the delta file over at least one wireless link.

26. The system of claim 1, further comprising a mobile client device that includes an embedded system, the embedded system configured to:
receive the delta file;
generate a copy of the new file using the delta file and a local copy of the original file; and
update a local copy of the original file using the copy of the new file.

27. The system of claim 26, wherein the mobile client device is at least one of a personal computer, portable computing device, cellular telephone, portable communication device, and personal digital assistant.

28. The system of claim 26, further comprising at least one server of a communication service provider coupled among the processor and the mobile client device, wherein the at least one server is configured to:
    receive the delta file from the processor;
    generate a message to the mobile client device in response to receipt of the delta file, wherein the message informs a user of the mobile client device of the availability of an update to the embedded system;
    receive a request for the update from the user; and
    provide the delta file to the mobile client device in response to the request.

29. The system of claim 1, wherein the original and new files comprise software files including dynamic link library files, shared object files, embedded software components (EBSCs), firmware files, executable files, data files including hex data files, system configuration files, and files including personal use data.

30. A system including
    a memory;
    a processor processing at least one application, the processor configured to:
    determine a longest common sub-string (LCS) between two byte streams;
    divide each of the two byte streams into a plurality of sub-streams, and when the LCS is at least a first pre-specified size, recursively determine another LCS between at least two sub-streams of the plurality of sub-streams and perform at least one division of each sub-stream until a size of the sub-streams is less than a second pre-specified size, wherein the second pre-specified size is proportional to computation time of byte level differencing between sub-streams of the plurality of sub-streams; and
    determine a byte-level difference between each of the corresponding sub-streams.

31. The system of claim 30, wherein the at least one processor is configured to generate a delta file that includes information of the byte-level difference.

32. The system of claim 31, wherein the at least one processor is configured to generate the delta file using a set of operation codes and a variable length integer format that eliminates redundant information in the delta file.

33. The system of claim 31, wherein the at least one processor is configured to transfer the delta file to at least one mobile device for use in updating electronic files of the mobile device.

34. The system of claim 30, wherein the two byte streams include byte streams of an original file and byte streams of a new file, wherein the byte-level difference represents a difference between the original file and the new file.

* * * * *